United States Patent [19]

Turner

[11] Patent Number: 5,179,556
[45] Date of Patent: Jan. 12, 1993

[54] BANDWIDTH MANAGEMENT AND CONGESTION CONTROL SCHEME FOR MULTICAST ATM NETWORKS

[75] Inventor: Jonathan S. Turner, St. Louis, Mo.

[73] Assignee: Washington University, St. Louis, Mo.

[21] Appl. No.: 740,009

[22] Filed: Aug. 2, 1991

[51] Int. Cl.$^5$ .............................................. H04J 3/14
[52] U.S. Cl. ..................... 370/94.1; 370/84; 370/91
[58] Field of Search ............... 370/95.1, 91, 85.7, 370/84, 85.4, 94.1

[56] References Cited

U.S. PATENT DOCUMENTS 4,679,187  7/1987  Irvin ................................ 370/95.1 X
4,849,968  7/1989  Turner ................................ 370/94.1
5,042,027  8/1991  Takase et al. ...................... 370/60 X

OTHER PUBLICATIONS

Article entitled "Resource Allocation for Broadband Networks" by Hui, published in the *IEEE Journal on Selected Areas in Communications*, vol. 6, No. 9, Dec. 1988.
Article entitled "Flow Control Schemes and Delay/-Loss Tradeoff in ATM Networks" by Ohnishi et al., published in *IEEE Journal on Selected Areas in Communications*, vol. 6, No. 9, Dec. 1988.
Article entitled "Distributed protocols for access arbitration in tree-structured communication channels" by Melen et al., published in *CSELT Technical Reports*, vol. XVI, No. 5, Aug. 1988.

Primary Examiner—Douglas W. Olms
Assistant Examiner—Russell W. Blum
Attorney, Agent, or Firm—Rogers, Howell & Haferkamp

[57] ABSTRACT

A bandwidth management and congestion control scheme for a multi-cast ATM network which includes a buffer reservation mechanism comprised of a state machine for association with each virtual circuit set up through the network, the state machine being adapted to monitor the number of available buffer slots at a data link and reading an encoding scheme for cells comprising a burst of data in order to control its switching from an active to an idle state to thereby control the flow of data through the virtual circuit. A state dependent token pool mechanism is associated with each virtual circuit and generates tokens at varying rates which are "used" by transmitted data in order to monitor and control the average data rate passing through a data link over a virtual circuit. By thus monitoring and controlling the peak data rate and average data rate, the bandwidth for each data link is efficiently managed to maximize data throughput and minimize loss of data cells from data bursts. A novel means for determining the availability of capacity on a data link for establishing a virtual circuit is also disclosed which depends on a probability calculation expressed in terms of the average data rate and peak data rate through a network link. This information is available through the buffer reservation mechanism and the token pool mechanism to facilitate the fast calculation required to establish a virtual circuit "on the fly". Various implementation details are also provided.

24 Claims, 10 Drawing Sheets

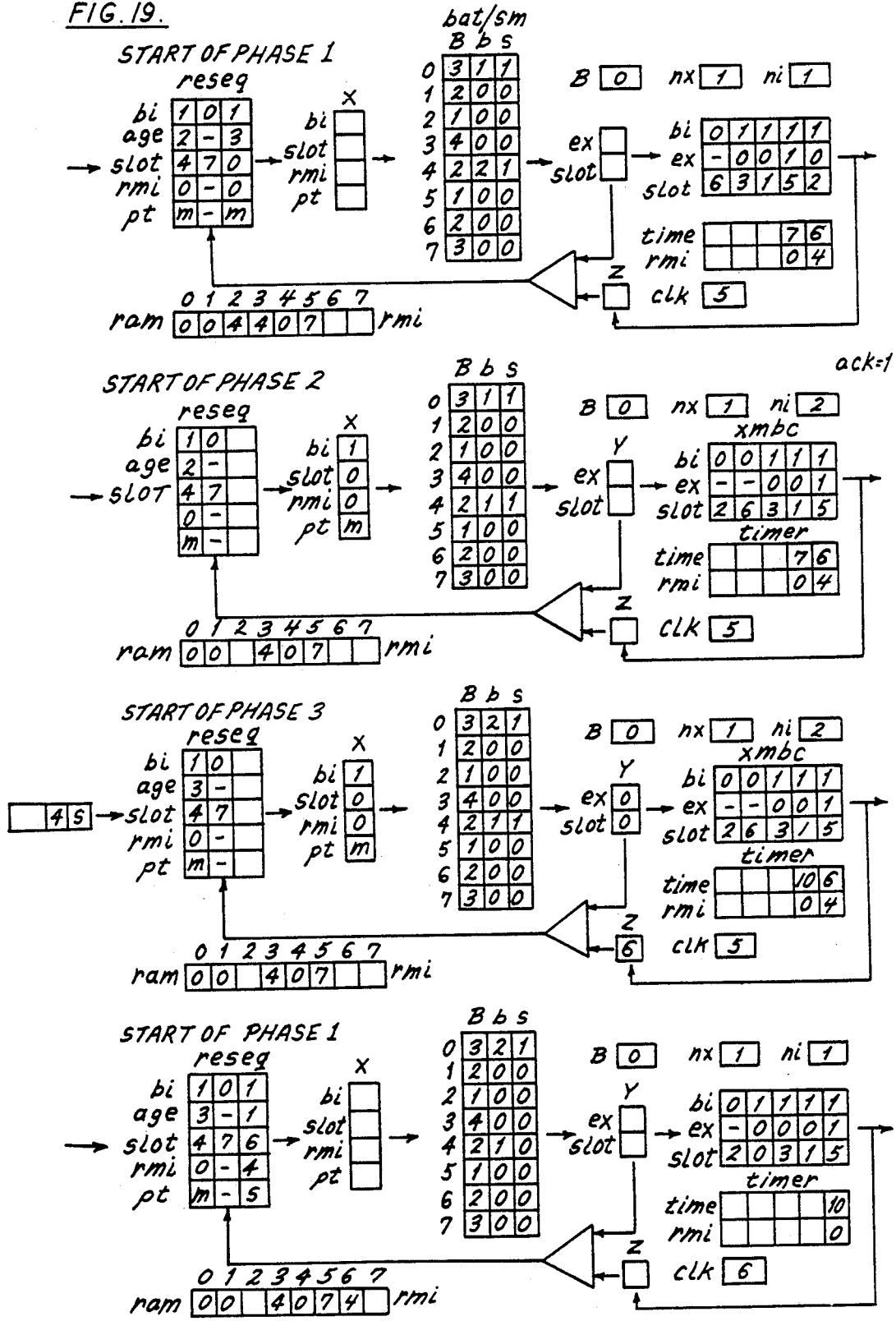

BANDWIDTH MANAGEMENT AND CONGESTION CONTROL SCHEME FOR MULTICAST ATM NETWORKS

GOVERNMENT RIGHTS

This invention was made with Government support under Grant No. NCR 8914396 awarded by the National Science Foundation. The Government has certain rights in the invention.

BACKGROUND OF THE INVENTION

A central objective in ATM networks is to provide virtual circuits that offer consistent performance in the presence of stochastically varying loads on the network. This objective can be achieved in principle, by requiring that users specify traffic characteristics when a virtual circuit is established, so that the network can select a route that is compatible with the specified traffic and allocate resources as needed. While this does introduce the possibility that a particular virtual circuit will be blocked or delayed, it allows established virtual circuits to receive consistent performance as long as they remain active.

Ideally, a bandwidth management and congestion control mechanism should satisfy several competing objectives. First, it should provide consistent performance to those applications that require it, regardless of the other virtual circuits with which a given virtual circuit may be multiplexed. Second, it should allow high network throughputs even in the presence of bursty traffic streams. (For typical transfer applications, a single burst may be tens or hundreds of kilobytes long; that is, there may be more than 1000 ATM cells in a burst, while the buffers in the switching systems will typically contain room for only a few hundreds of cells.) Third, the specification of traffic characteristics should be simple enough that users can develop an intuitive understanding of the specifications and flexible enough that inaccurate specifications don't have seriously negative effects on the user. Fourth, it should not artificially constrain the characteristics of user traffic streams; the need for flexibility in ATM networks makes it highly desirable that traffic streams be characterized parametrically, rather than by attempting to fit them into a pre-defined set of traffic classes. Fifth, it must admit a simple realization for reasons of economy and reliability. Less crucial, but in our view, also important, is the requirement that the bandwidth management mechanism accommodate multicast virtual circuits with multiple transmitters. All proposals we have seen for connection management in ATM networks have serious deficiencies with respect to at least one of these objectives.

In the prior art, many different approaches to the bandwidth management problem have been proposed and studied by various groups. Three representative approaches are summarized as follows.

Peak Rate Allocation

In this approach, the user simply specifies the maximum rate at which cells are to be sent to the network, and the network routes virtual circuits so that on every link, the sum of the peak rates of the virtual circuits using that link is no more than the link's maximum cell rate. The network also must supply a mechanism to monitor the rate at which the user actually sends cells and in the event that the user exceeds the specified rate it may do one of three things; discard the offending cells, mark them by setting a bit in the header informing switches along the virtual circuit path that the marked cell can be discarded if the presence of congestion requires that something be discarded, or flow control the user. FIG. 1 illustrates this method. Note that in the peak rate monitor, the illustrated lookup table records, for virtual circuit i, a minimum inter-cell spacing $d_i$ and the time the most recent cell was transmitted, $t_i$. By subtracting $t_i$ from the current time T, the monitor can decide whether or not to pass the cell unchanged to the network. Note that in this simple approach, the user's peak rate must be of the form R/j where R is the link rate (typically 150 Mb/s) and j is an integer.

Peak rate allocation offers a very strong performance guarantee, is easy for users to understand and specify and admits a very straightforward implementation. Its obvious drawback is that it makes poor use of network bandwidth in the presence of bursty traffic.

Minium Throughput Allocation

In this approach, the user specifies the throughput that is needed when the network is congested. The user is free to exceed this rate whenever desired, but the network guarantees only the specified throughput. One way to implement this is for the network to allocate slots in link buffers to virtual circuits in direct proportion to their required throughput. Thus if a given virtual circuit requires 20% of the link's bandwidth, it is allocated 20% of the buffer slots. This allocation only comes into play during overload periods. During those overload periods however, each virtual circuit has access only to its buffer slots and any excess cells may be discarded.

Virtual circuit routing ensures that the sum of the minimum required throughputs does not exceed the link bandwidth. To implement the scheme, it is necessary to track the number of buffer slots in use by each virtual circuit and mark cells if the number of buffer slots already in use is equal to the virtual circuit's allocation. The buffer controller must also have the ability to discard marked cells if an unmarked cell arrives at a time when the buffer is full. This is illustrated in FIG. 2, where the table entry $B_i$ is the number of buffer slots allocated to virtual circuit i and $b_i$ is the number of buffer slots currently in use by unmarked cells belonging to virtual circuit i.

This approach is easy to specify and can provide high efficiency. The implementation, while more complex than peak rate allocation need not be excessively complex. The drawback is that the performance guarantee is rather weak. The network can't promise anything about throughput in excess of that requested, since it has no advance knowledge of to what extent, users will transmit information in excess of their required throughput. Users with bursty traffic streams, but needing all or almost all of their data to get through, regardless of other traffic, can specify a high required throughput, but this essentially leads to peak rate allocation, the prior art approach discussed above.

Bursty Traffic Specification and Allocation

In this approach, the user specifies a peak cell rate, an expected average cell rate and a maximum burst size. The network uses these parameters to configure a peak rate monitor (as described above), and a per virtual circuit token pool at the interface to the network; this is shown in FIG. 3. Whenever the user transmits a cell, a token is consumed from the token pool. If there are no tokens available, the cell can either be buffered or marked for preferential discarding (in the event it encounters congestion) and in either case, the user would be informed of this action, allowing the user to defer further transmissions. Tokens are replenished at the user's specified average rate with the maximum number of tokens in the token pool limited by the specified maximum burst size. When routing virtual circuits, the network must be able to decide if a given set of virtual circuits can be safely multiplexed together; that is, if multiplexing a given set of virtual circuits with known traffic parameters will result in an acceptable cell loss rate or not.

This approach allows performance guarantees to be traded off against link efficiency and traffic burstiness. It is somewhat more difficult for users to understand and specify, but is still reasonable since the consequences of an incorrect specification are not serious. The excess traffic is simply not guaranteed (but may still get through) and since the user is informed of the excess traffic, he can either modify the dynamic behavior of the traffic or request that the network adjust the traffic parameters. The main drawback of this approach is that there are currently no computationally effective ways to decide when a new virtual circuit can be safely multiplexed with other virtual circuits specified in this manner. (To allow rapid call setup, the determination of whether a given call can be safely added to a link must be made in at most a few milliseconds. Current computational methods are at least several orders of magnitude away from this objective.)

There are two other deficiencies that the above approaches suffer from in varying degrees. First, because cell marking and discarding is done on a cell basis rather than on a burst basis, it is necessary to have very low cell loss rates in order to achieve acceptable burst loss rates. This is particularly problematic in the context of the very small cells that have been standardized for use in ATM networks. Since end-to-end protocols will typically operate on the basis of much larger data units, comprising many ATM cells, it would be desirable for an overloaded network to react by discarding cells from as few virtual circuits as possible, rather than discarding cells indiscriminately from all virtual circuits. This problem is illustrated in FIG. 4, which shows a single lost cell in a burst, resulting in retransmission of the entire end-to-end date unit. A second limitation of the above schemes is that they are not sufficient in and of themselves to handle multicast virtual circuits in which there can be multiple transmitters.

In order to solve these and other problems in the prior art, the inventor herein has succeeded in designing and developing a technically feasible and economically implementable approach to bandwidth management and congestion control for point-to-point and one-to-many virtual circuits. This approach is first considered in the context of a network comprised of single source virtual circuits, or point-to-point virtual circuits, and is then extended to multicast circuits with a single transmitter. Conveniently, this same approach may be further extended to handle the more general case of multicast virtual circuits with more than one transmitter wherein the virtual circuit bandwidth is dynamically shared among all the transmitters.

In essence, the basic approach of the present invention, at least in the first instance, is to associate a state machine with two states with each virtual circuit passing through a given link buffer. The two states are idle and active. When a given virtual circuit is active, it is allocated a prespecified number of buffer slots in the link buffer and it is guaranteed access to those buffer slots until it becomes inactive, which is signalled by a transition to the idle state. Transitions between the active and idle states occur upon reception of user cells which have been encoded as either start of burst or end of burst cells. This technique dramatically reduces the problem discussed above in the prior art of discarding cells out of a burst to thereby require retransmission of the entire burst.

In still another feature of the present invention, a virtual circuit acceptance algorithm has been developed for the control software which permits the rapid determination of whether a new virtual circuit can be safely multiplexed through the network, given a set of preexisting virtual circuits. The algorithm of the present invention relies on a probability model which may be quickly calculated in order to determine whether the probability is small that the desired set of virtual circuits requires more buffers slots than are available. This algorithm, which relies on a probability calculation, represents a dramatic departure from the prior art and can be applied directly to constant rate virtual circuits and well as to bursty virtual circuits. Also, the call acceptance algorithm explained herein does not depend directly on the length of the user's information bursts. This is an attractive feature of the present invention since the burst length is perhaps the single most difficult parameter for users to quantify. While burst length does not affect the excess buffer demand probability (the probability that the buffer slots required are greater than those available), the time duration of bursts does affect the duration of excess demand periods. Because the call acceptance decision is not based on burst length, it ensures only that excess demand periods are rare. It does not limit their length in any way.

In order to implement the call acceptance algorithm of the present invention, it is necessary that the network have knowledge of the user's peak and average date rate. This must be determined by monitoring the actual usage during a call to ensure that the user does not exceed the stated bounds. By implementing the buffer reservation mechanism utilizing the state machine, a user's peak rate is monitored such that excess cells are not certain to pass through the link buffer. In order to monitor average usage, an additional mechanism at the interface between the network and a host or terminal connected to the network is required. This additional mechanism comprises a state machine that mimics the state machines of the buffer reservation mechanism, except that it is augmented with a token pool, as described in the prior art section, above. This token pool augmentation effectively monitors and controls the user's average rate of transmission and limits it to be within the parameters assigned to that particular virtual circuit. This ensures that over the long term, the probability that the virtual circuit is active is no more than what was assumed at the time the call acceptance decision was made with the algorithm of the present invention.

In order to extend the present invention to a network capable of general multicast virtual circuit connections, the state machine may be modified by slightly modifying the individual cell encoding in a given burst. Such encoding would utilize a begin cell which would function like a start cell except that a source is allowed to transmit only one begin cell per burst and, importantly, must match it with an end cell. A counter is then also implemented which would be incremented upon receipt of a begin cell and decremented upon receipt of an end cell. Thus, a state machine so extended for general multicast virtual circuits would remain active, and only release the buffers, when all sources have become idle, as would correspond to the counter reading zero.

The token pool mechanism would also be extended for the general multicast virtual circuit network by having a token pool at every source location, with each token pool monitoring the total traffic on the virtual circuit, but controlling the flow of cells only from its local source. The use of a token pool at every interface makes the implementation simpler and more uniform than the use of a single more central token pool which communicates with the network interfaces adjacent to the sources using control messages.

There is also disclosed herein specific implementation details which represent the preferred embodiment for the present invention. However, it should be understood that this implementation is being provided only within the context of a preferred embodiment and should not be considered as limiting. Instead, it is being provided merely as illustrative as the present invention may be implemented with different circuitry depending upon the particular network being considered, and depending upon the particular form of electronics utilized in the realization of the network.

BRIEF DESCRIPTION OF THE DRAWINGS

FIG. 19 is a set of tables which illustrate the operation of the buffer controller shown in FIG. 18.

DETAILED DESCRIPTION OF THE PREFERRED EMBODIMENT

Figure 5:
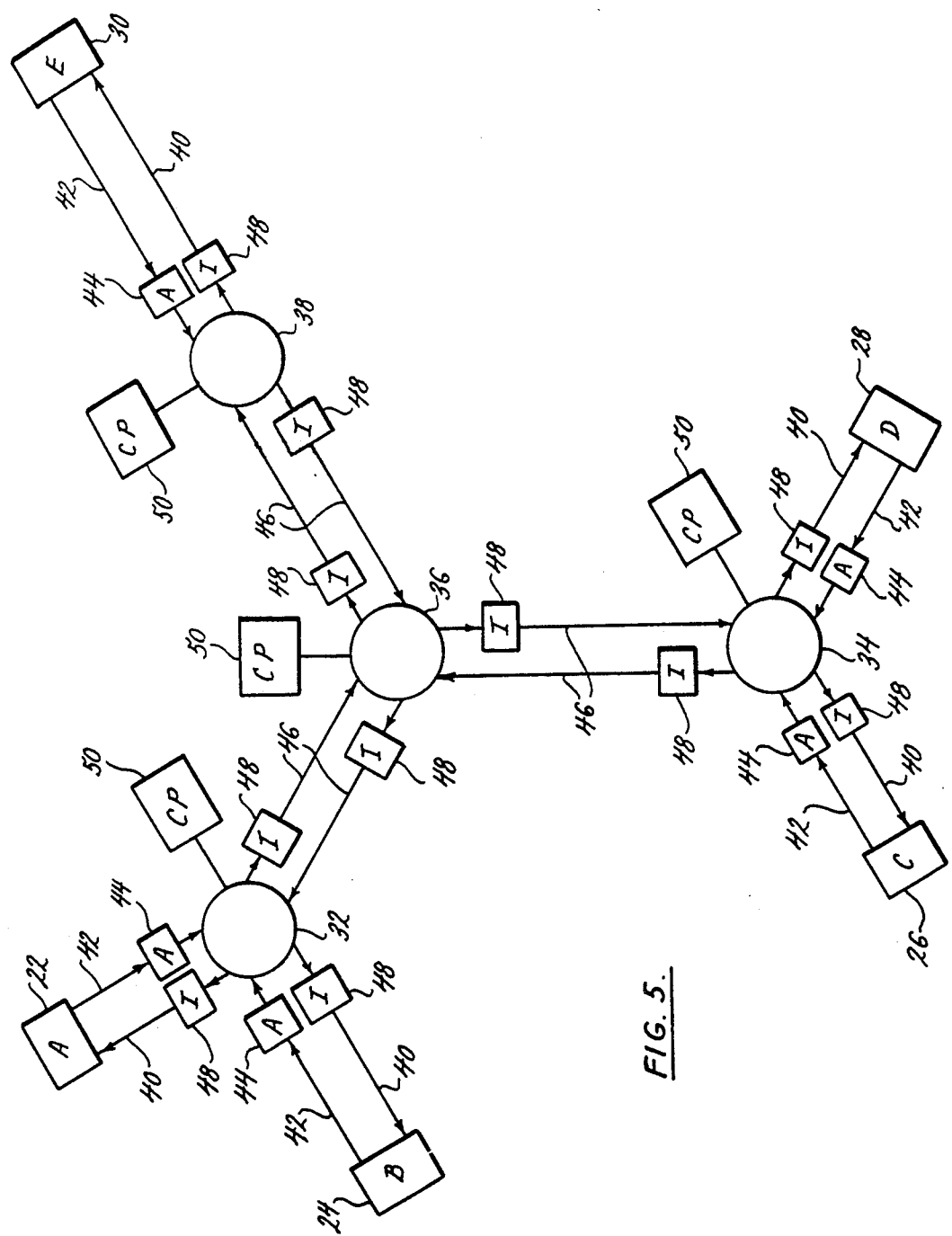
FIG. 5 is a block diagram of a typical ATM network implementing the bandwidth management and congestion control scheme of the present invention.

As shown in FIG. 5, the present invention is implemented in a multinode ATM network 20 which includes a plurality of hosts 22, 24, 26, 28, and 30, each of which may comprise a data terminal adapted for receiving and/or transmitting data through the network to any other of the data terminals. Each data terminal 22-30 has a pair of links connecting it to one of the switches 32, 34, 36, 38 through which the data is routed to its eventual destination. As is evident from considering FIG. 5, each data terminal 22-30 has an incoming data link 40 and an outgoing data link 42. Connected between each data terminal and the first switch is an access resource manager 44. Every other data link, including the internal data links 46 which interconnect the switches, is an internal resources manager 48. Thus, each data link has an associated resource management circuit which controls the flow of data therethrough. These resource managers 44, 48 comprise the subject of the present invention, in part.

Additionally, it is noted that each switch has a control processor 50 associated therewith. As is well known in the prior art, these control processors 50 control the switching fabric comprising the switches 32-38 in order to set up the virtual circuits therethrough, assign buffer space, and perform such other functions as is sufficient and necessary to ensure the proper routing of data packets therethrough. The virtual circuit acceptance algorithm of the present invention is implemented in the control processor 50 and helps to optimize the routing of virtual circuits through each switch.

Figure 6:
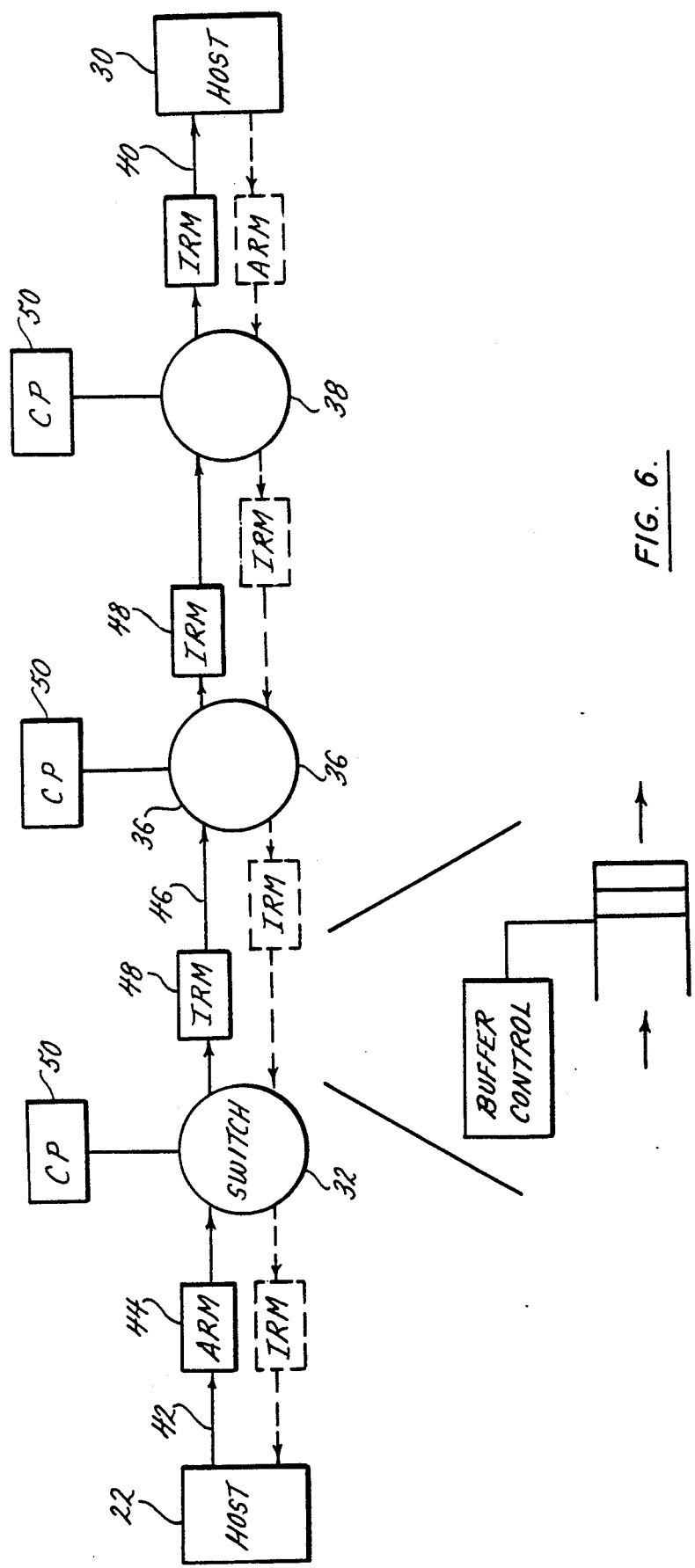
FIG. 6 is a block diagram illustrating in greater detail a single branch of the bandwidth management and control scheme of the present invention.

For simplification, a portion of the ATM network 20 shown in FIG. 5 has been broken out and further illustrated in FIG. 6, with the same elements of the network 20 having the same identifying numbers as is shown in FIG. 5. The state machines and token pool mechanisms associated with the virtual circuits are found in these access resource managers 44 and internal resource managers 48, as is explained in further detail below.

A complete set of mechanisms for point-to-point virtual circuits and for multicast circuits with a single transmitter will now be described. As mentioned in the Background and Summary, one crucial problem with most earlier approaches to bandwidth management and congestion control is that they do not directly address the need to allocate network resources to traffic bursts in order to preserve the integrity of the burst as a whole. One exception can be found in Boyer, P. "A Congestion Control for the ATM," *International Teletraffic Congress Seminar on Broadband Technologies: Architecture, Applications and Performance*, 10/90, which mentions a fast bandwidth reservation scheme to handle burst traffic with low peak rates. We have adopted a similar approach, but apply it to the more difficult rate of burst traffic with peak rates that can be a large fraction of the link bandwidth. We also adopt an implementation in which the reservation is made as the data is sent. This eliminates the need for explicit control messages, simplifying the implementation and allowing more rapid response to user traffic. Furthermore, we integrate the buffer reservation idea into a larger framework that provides a comprehensive solution to the bandwidth management problem.

FAST BUFFER RESERVATION

To preserve the integrity of user information bursts, the network must detect and track activity on different virtual circuits. This is accomplished by associating a state machine with two states with each virtual circuit passing through a given link buffer. The two states are idle and active. When a given virtual circuit is active, it is allocated a prespecified number of buffer slots in the link buffer and it is guaranteed access to those buffer slots until it becomes inactive, which is signalled by a transition to the idle state. Transitions between the active and idle states occur upon reception of user cells marked as either start-of-burst or end-of-burst. Other cell types include middle-of-burst and loner, the latter is used to designate a low priority cell that is to be passed if there are unused buffer slots available, but which can be discarded if necessary. A forced transition from active to idle is also made if no cell is received on the virtual circuit within a fixed timeout period.

Figure 1:
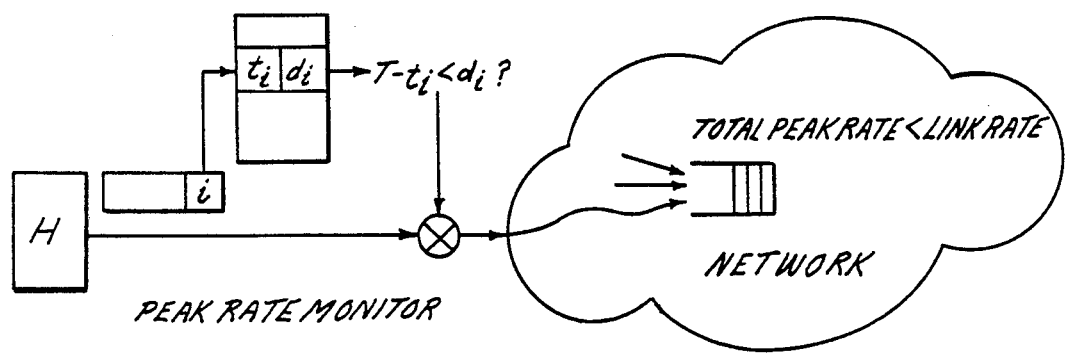
FIG. 1 is a block diagram of a prior art bandwidth management method known as peak rate allocation.
Figure 2:
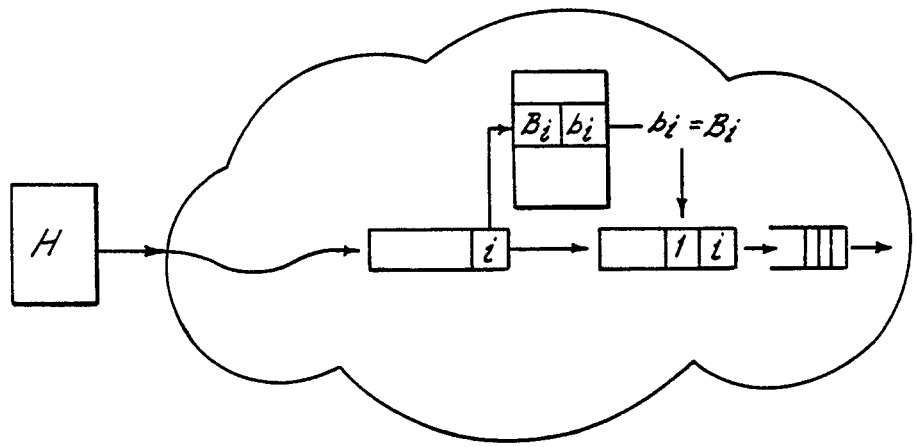
FIG. 2 is a block diagram of a prior art bandwidth management known as minimum throughput allocation.
Figure 3:
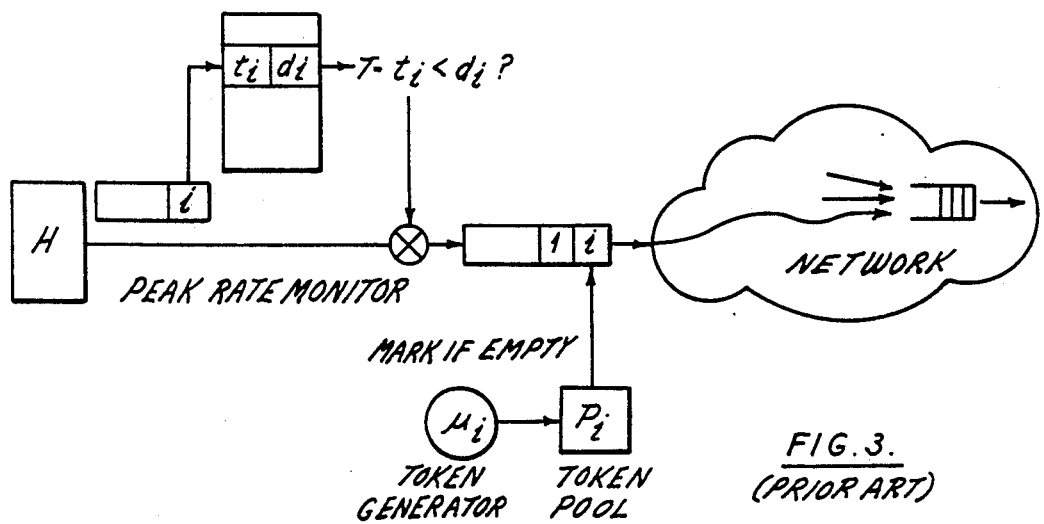
FIG. 3 is a block diagram of a prior art bandwidth management method known as bursty traffic specification and allocation.
Figure 4:
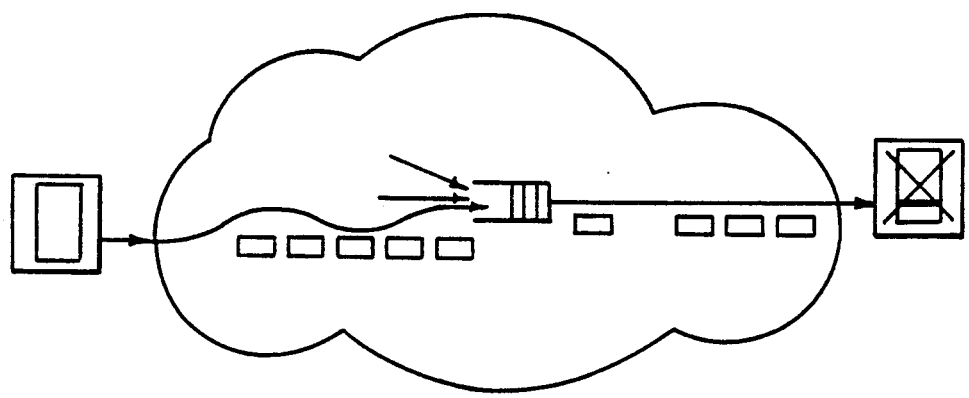
FIG. 4 is block diagram illustrating the effect of cell discarding on data bursts.
Figure 7:
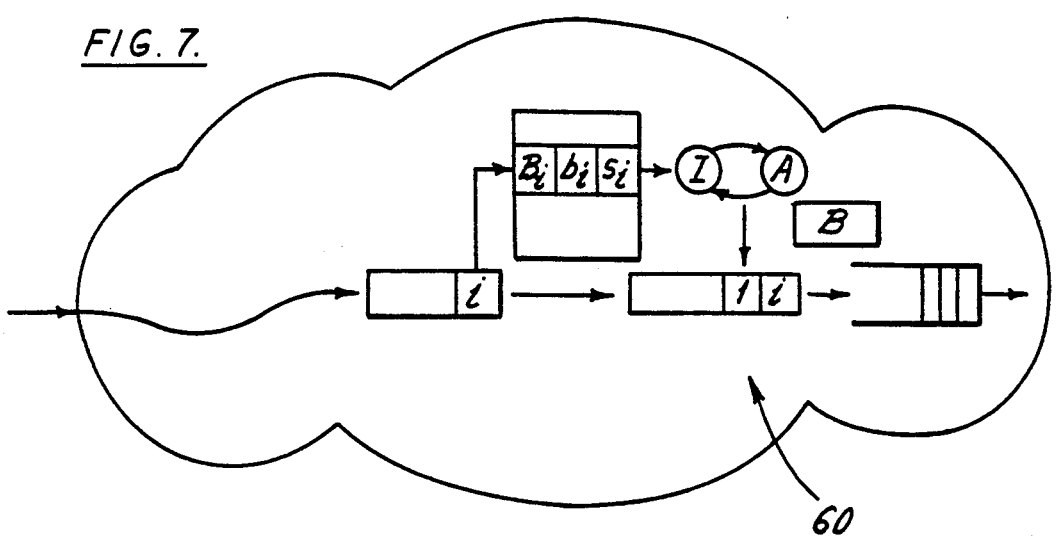
FIG. 7 is a block diagram of the buffer reservation mechanism utilizing a state machine.

FIG. 7 illustrates the buffer reservation mechanism 60. For virtual circuit i, the mechanism stores the number of buffer slots needed when the virtual circuit is active ($B_i$), the number of buffer slots used by unmarked cells ($b_i$) and a state variable ($s_i$: idle, active). The mechanism also keeps track of the number of unallocated slots in the buffer (B). The detailed operation of the state machine for virtual circuit i is outlined below.

When a start cell is received:
If the virtual circuit is in the idle state and $B - B_i < 0$, the cell is discarded.
If the virtual circuit is in the idle state and $B - B_i \geq 0$, $s_i$ is changed to active, a timer for that virtual circuit is set and $B_i$ is subtracted from 8. If $b_i < B_i$, $b_i$ is incremented and the cell is placed (unmarked) in the buffer. If $b_i = B_i$, the cell is marked and placed in the buffer.

If a start or middle cell is received while the virtual circuit is in the active state, it is queued and the timer is reset. The cell is marked, if upon reception, $b_i = B_i$, otherwise it is left unmarked and $b_i$ is incremented.

If a middle or end cell is received while the virtual circuit is in the idle state, it is discarded.

If an end cell is received while the virtual circuit is active or if the timer expires, $s_i$ is changed from active to idle and $B_i$ is subtracted from B.

If a loner is received, it is marked and placed in the buffer.

Whenever a cell is sent from the buffer, the appropriate $b_i$ is decremented (assuming the transmitted cell was unmarked).

The duration of the timeout which forces the eventual return to the idle state is determined primarily by the delay variation in the network. An interval of approximately 100 cell transmission times appears to be about right. This translates to about 300 $\mu$s for ATM cells and 150 Mb/s transmission links.

In the most common case, the end-to-end protocol would send a burst of the form sm . . . me where s denotes a start cell, m a middle cell and e an end cell. Notice that in this case, if when the start cell arrives, there are not enough unallocated buffer slots to accommodate the burst, the entire burst is discarded. The state machine has been designed to allow other options as well. For example, a burst of the form ss . . . se is permissible. In this case, the state machine would attempt to allocate the buffer slots every time it received a start cell, so even if part of the burst was lost, at least the tail end of it is likely to get through. This type of behavior might be preferred for voice circuits, for example, where clipping of a talk spurt might be acceptable but deletion of an entire talk spurt would not be. Another allowed option is a burst of the form sm . . . msm . . msm . . . me. A burst of this form could be used to transport a large file, where an end-to-end transport protocol performs retransmission on packets that are much larger than a single cell but smaller than the entire file.

When a virtual circuit is routed, the software that makes the routing decisions attempts to ensure that there is only a small probability that the instantaneous demand for buffer slots exceeds the buffer's capacity. This probability is called the excess buffer demand probability and might typically be limited to say 1%. We'll show in the next subsection how fast virtual circuit routing decisions can be made, while bounding the excess buffer demand probability.

First, however, it is worth considering a variation on the buffer reservation scheme. As described, the mechanism requires two bits of the ATM cell header to encode the cell type (loner, start, middle, end). The CLP and RES bits of the current standard ATM cell header can reasonably be redefined for this purpose.

Another approach is to avoid non-standard header bits by using just the CLP bit and interpreting it as follows.

When in the idle state, a cell with the CLP bit set (indicating a discardable cell) is treated as a loner; a cell with CLP cleared is treated as a start cell.

When in the active state, a cell with the CLP bit set is treated as an end cell and a cell with CLP cleared is treated as a middle cell.

The obvious advantage of this approach is that it avoids non-standard headers. The drawbacks are first that loners (or more generically, low priority cells) cannot be sent during a burst and second, the network cannot filter out clipped bursts, meaning that the end-to-end transport protocols must receive and discard such burst as appropriate. While we recognize both of these as legitimate approaches, we will continue to describe the system using explicit start, middle, end and loner cells because in our view it is easier to understand in this form and it is technically superior. We recognize that other considerations may dictate the use of the alternative approach and just note here that such a modification is straightforward.

VIRTUAL CIRCUIT ACCEPTANCE ALGORITHM

When selecting a route for a virtual circuit, it is necessary for the control software to decide if a new virtual circuit can be safely multiplexed with a given set of pre-existing virtual circuits. We consider the multiplexing of a given set of virtual circuits to be acceptable if at a random instant, the probability is small that the set of virtual circuits requires more buffer slots than are available (this is called the excess buffer demand probability).

To make this precise, let $\lambda_i$ denote the peak data rate of a given virtual circuit and let $\mu_i$ denote the average rate. If the link rate is R and the buffer had L buffer slots, the number of slots needed by an active source with peak rate $\lambda_i$ is defined to be $B_i = \lceil L\lambda_i/R \rceil$.

Since $B_i$ buffers are allocated to a virtual circuit when it is active, the virtual circuit's instantaneous buffer requirement is either 0 or $B_i$. If we let $x_i$ be a random variable representing the number of buffer slots needed by virtual circuit i at a random instant then $$Pr(x_i = B_i) = \mu_i/\lambda_i \quad Pr(x_i = 0) = 1 - \lambda_i/\mu_i$$

Consider then, a link carrying n virtual circuits with instantaneous buffer demands $x_i, \ldots, x_n$. Define $X = \Sigma^n_{i=1} x_i$. Note that X represents the total buffer demand by all the virtual circuits. Suppose we have a new virtual circuit with buffer demand $x_{n+1}$ and we want to decide if it can be safely added to the link. We first must compute, the probability distribution of the random variable $X' = X + x_{n+1}$. This can be obtained by numerical convolution of the distribution of X with the distribution of $x_{n+1}$, assuming that the idle, active behavior of the new virtual circuit is independent of the existing virtual circuits. In particular, we can compute for any $j \geq 0$, the probability of $X' = j$ using the equation $$Pr(X' = j) = Pr(X = j)(1 - \mu_{n+1}/\lambda_{n+1}) + Pr(X = j - B_{n+1})(\mu_{n+1}/\lambda_{n+1})$$

(when $j < B_{n+1}$, $Pr(X = j - B_{n+1})$ is of course 0). To decide if the virtual circuit can be accepted, we then check that the probability in the tail of the distribution for X' is small. In particular, we accept if the excess buffer demand probability, given by the following equation, is $\leq \epsilon$, where $\epsilon$ is a network parameter such as 0.01.

$$Pr(X' > L) = \sum_{j > L} Pr(X' = j) = 1 - \sum_{j=0}^{L} Pr(X' = j)$$

To allow for statistical delay variations in the network, it is advisable to hold some of the buffer slots "in reserve" when making call acceptance decisions. This can be accomplished by replacing L in the last equation by some $L' < L$. For $L = 256$, we might choose $L' = 224$ leaving 32 of the 256 buffer slots as a reserve.

Since a given set of virtual circuits is acceptable only if the probability in the tail of the distribution is small, it is not necessary to retain the entire distribution. In fact, for a buffer of size 256, we can probably safely neglect the terms in the distribution for $X > 1000$. Since the time required to convolve the distribution of $x_{n+1}$ with the distribution for X is proportional to the number of nonzero terms in the distribution for X, this bounds the running time. To compute the convolution and check the tail probability would require, in this example, about 2000 multiplications and 1250 additions. Using fixed point arithmetic, this can be done in less than half a millisecond on a 10 MIPS processor.

Note that the buffer reservation mechanism can be applied directly to constant rate virtual circuits as well as to bursty virtual circuits. Such virtual circuits would simply be made active initially and remain active all the time. We can accomplish this effect without an explicit table entry for the constant rate circuits by simply subtracting $B_i$ from the buffer-slots-available register B at the start of the call. For bursty virtual circuits with a small peak rate (say, less than 2% of the link rate), we can use a similar strategy. This is discussed in more detail in a later section.

Also note that the call acceptance decision does not depend directly on the length of the user's information bursts. This is an attractive feature of the scheme, since the burst length is perhaps the single most difficult parameter for users to quantify. While burst length does not affect the excess buffer demand probability, the time duration of bursts does affect the duration of excess demand periods. Because the call acceptance decision is not based on burst length, it ensures only that excess demand periods are rare. It does not limit their length in any way. Fortunately, the length of the excess demand periods is a much less critical performance parameter and so a loose control method is probably sufficient. One simple method is to limit the time duration of a burst to some fixed value such as one second. Applications requiring longer burst durations would be required to establish a new virtual circuit to accommodate the burst.

Usage Monitoring

Figure 8:
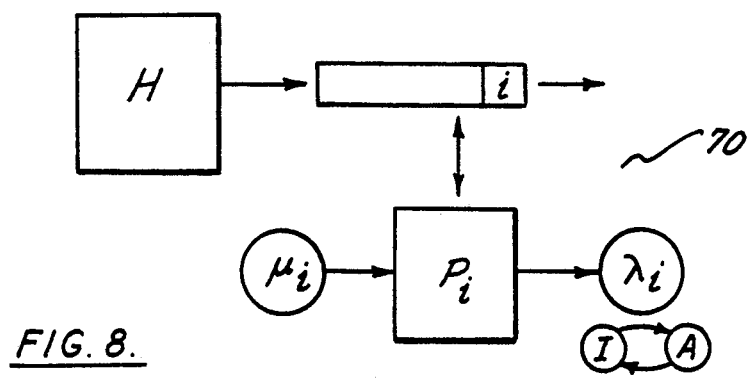
FIG. 8 is a block diagram of the modified token pool mechanism to incorporate a state machine.

Because call acceptance decisions are based on the network's knowledge of the user's peak and average data rate, the network must monitor actual usage during a call to ensure that the user does not exceed the stated bounds. Note that the buffer reservation mechanism already described effectively monitors the peak rate, since if a user transmits at greater than the peak rate, the excess cells are not certain to pass through the link buffer. To monitor average usage, we need an additional mechanism at the interface between the network and a host or terminal, connected to the network. The token pool described earlier can be adapted to this purpose. We augment the token pool with a state machine that mimics the state machines at the link buffers. Recall that when the state machine at the link buffer is active, $B_i$ buffer slots are allocated to the virtual circuit, allowing the virtual circuit to transmit at its peak rate. To account for this properly, the state machine at the interface must cause tokens to be consumed at the peak rate, regardless of the user's actual transmission rate. This is illustrated in FIG. 8. The operation of the modified token pool 70 is detailed below.

If a start cell is received on virtual circuit i while the virtual circuit is in the idle state:
If the number of tokens in the token pool, $C_i$, is $\leq 0$ the cell is discarded.
If $C_i > 0$ the state $s_i$ is changed to active, and a timer for that virtual circuit is set.

So long as the state machine is in the active state, tokens are removed from the token pool at the peak rate $\lambda_i$. This may cause the token pool contents to become negative.

If a start or middle cell is received while the virtual circuit is in the active state and $C_i > 0$, it is passed and the timer is reset.

If an end cell is received while active or if the timer expires, $s_i$ is changed from active to idle.

If a start, middle or end cell is received when in the active state and $C_i \leq 0$, the cell is converted to an end cell and passed on. Also, the state is changed from active to idle.

If a middle or end cell is received while the virtual circuit is in the idle state, it is discarded.

If a loner is received, it is passed on to the network.

The timeout period would be the same as in the switches.

In the typical case, the user transmits a start cell, followed by a sequence of middle cells and an end cell, while the token pool contents remains positive. As soon as the user sends the end cell, tokens are no longer drained from the token pool and the token generator replenishes the supply of tokens in preparation for the next burst. If the user attempts to continue to send tokens after the token pool contents are exhausted, the network forces a return to the idle state by converting the user's next cell to an end cell, which has the effect of releasing the buffers reserved in the switches all along the virtual circuit's path.

An alternative to the approach taken here is for the token generator to send an explicit buffer release cell as soon as the token pool contents reaches 0. This has the advantage that the buffers are released sooner than they would otherwise be, but requires a somewhat more complex implementation. By allowing the token pool contents to drop below zero, we delay the next burst the user can send in direct proportion to the amount of "extra time" that the buffers have been held in the current burst. This ensures that over the long term, the probability that the virtual circuit is active is no more than what was assumed at the time the call acceptance decision was made.

To facilitate use of this mechanism by end user equipment, the token pool mechanism should have the ability to send a flow control cell to the user, when the token pool contents drops below some threshold. The user's network interface would respond to such a flow control message in one of two ways. First, it could suspend transmission on that virtual circuit temporarily, resuming transmission after enough time has passed to ensure that the token pool is replenished. For most computer-based applications, this would be straightforward to implement. Second, it could continue transmission on the virtual circuit, but switch to loner cells. While delivery could no longer be guaranteed, it may be preferable in some applications to continue to transmit with some losses than to suspend transmission altogether.

Host Computer Interface

Figures 9, 10, 11:
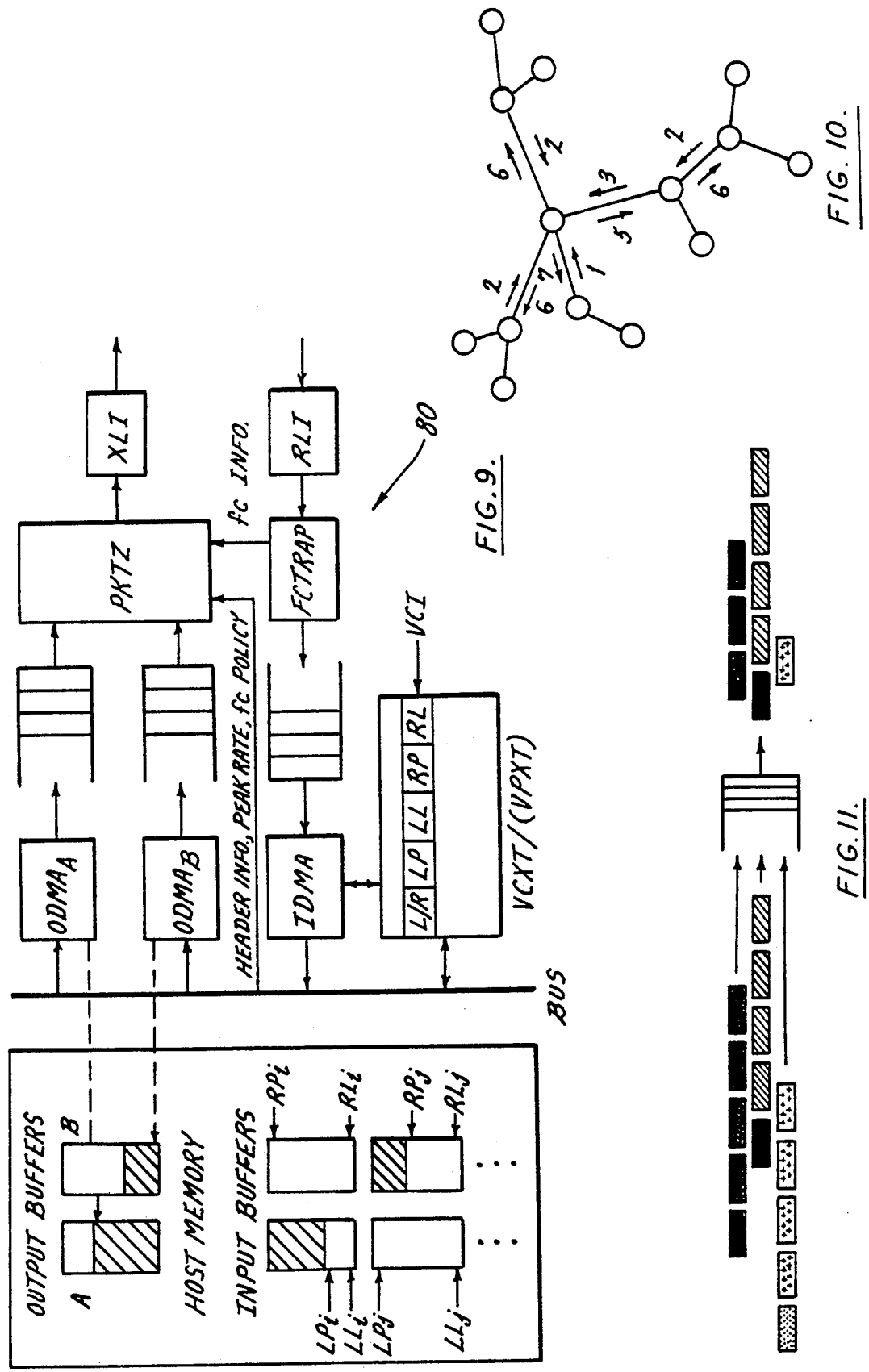
FIG. 9 is a block diagram of a host interface device that can be used in conjunction with the present invention.
FIG. 10 is block diagram illustrating the bandwidth limitations in a network with multipoint connections.
FIG. 11 is a block diagram illustrating the effect of collisions among bursts which occur with multiple sources transmitting through a single buffer.

The interface between a host computer and the network is a crucial element of an effective network design. We describe here one possible host interface design to illustrate how resource management requirements might affect the interface. We refer to the host-to-network interface as an ATMizer 80. FIG. 9 shows how such a device might be implemented.

The ATMizer would be implemented as a card connected to the host's internal bus. Data is transferred to and from the ATMizer across the bus using one of three DMA channels. Two output channels are provided to send data from the host to the network. Each output channel has an associated DMA channel that transfers data from memory-resident buffers to an on-board fifo. The Packetizer (PKTZ) takes data from the fifo, adds header information and send cells to the network through the Transmit Link Interface (XLI). The packetizer transmits cells on each channel at the virtual circuit's peak rate. When all the data in the host's buffer has been transmitted, the ATMizer interrupts the host. At this point the host selects a new buffer for transmission and programs the channel to transmit data from that buffer. This may involve switching to a new virtual circuit. Flow control cells coming from the network are intercepted by the Flow Control Trap (FCTRAP) which passes the flow control information to the packetizer. The packetizer responds to a flow control cell by either suspending transmission on that virtual circuit and interrupting the host, or by labeling subsequent cells as loners. When the host programs the packetizer, it supplies the header information to be inserted in every cell, the peak transmission rate and the flow control policy. The flow control policy determines how the cells are to be labeled (that is the usage of start, middle, end or loner cell types) and how the packetizer should respond to flow control cells from the network. Two output channels are provided so that one can be used for virtual circuits whose bursts can be transmitted very quickly and the other reserved for bursts that might tie up the channel for a longer period of time. Of course, a single channel implementation is also possible, as is an implementation with many channels. The variant shown here seems to offer an attractive cost/performance compromise.

Cells arriving from the network pass through an input DMA channel to memory-resident buffers. For each incoming virtual circuit, we assume two buffers are supplied. This allows the host software to prepare a new input buffer for a virtual circuit while data is coming into the other buffer. When the input DMA channel processes a cell, it extracts the appropriate buffer pointers from an on-board Virtual Circuit Translation Table, using the Virtual Circuit Identified (VCI) in the cell's header. The header information is stripped off by the DMA channel, so that only the end-user information is transferred to memory. The channel would typically switch to the second buffer either upon filling the current buffer or upon receipt of an end cell. It would also interrupt the host at this point, to give the host time to prepare a new buffer. The board could contain a Virtual Path Translation Table (VPXT) in addition to the VCXT if desired. We note however, that a separate VPXT is not really necessary even for hosts that wish to make use of virtual paths. If the host simply constrains (in software) the choice of VCI's so that every incoming VCI is unique (including VCIs associated with different VPIs), it can avoid the need for an on-board VPXT.

General Multicast Virtual Circuits

We now turn to the question of how to allocate bandwidth to multicast virtual circuits in which there may be more than one source. Such virtual circuits can be useful for multiparty conference connections, and for joining multiple local-area-networks, emulating a conventional bridged-LAN environment.

FIG. 10 illustrates a multicast virtual circuit in which each of the eight "leaf nodes" can both transmit and receive data on the virtual circuit. If bandwidth management is done on the basis of a single source's data transmission rate, the required bandwidth in the network is unevenly distributed and will change as the number of endpoints in the connection changes. The numbers adjacent to the links in FIG. 10 indicate the number of sources that can send in each direction on each link.

In order to facilitate dynamic addition of new endpoints, it's desirable to decouple the bandwidth allocation from the addition of individual endpoints. This observation leads us to define a virtual circuit's bandwidth requirements in a way that is independent of the number of sources. That is, we view the allocated bandwidth as belonging to the virtual circuit as a whole, not to the individual transmitter. This allows greater flexibility for the users, since the common bandwidth pool provided by the virtual circuit, can be shared in a variety of different ways. One common way to share the bandwidth would be to have one source active at a time and while active, it would use the entire bandwidth. Equal sharing by all the sources would be another common choice.

Given this concept of a common bandwidth pool shared by all the sources, we need mechanisms to ensure that the collection of sources does not use more bandwidth than is allocated to the virtual circuit. It's necessary to constrain both the peak and average rates on the virtual circuit as a whole. This requires extensions to both the buffer reservation mechanism in the link buffers and the token pool mechanism in the network interface. The required extensions are described in the following subsections.

As a side issue, we note that the virtual path mechanism is useful for general multicast connections. Since VCIs are passed unchanged on virtual paths, the VCI field can be used, in multicast virtual paths, to identify which of several sources sent a given cell. Other mechanisms for source discrimination are of course possible, but this one is particularly attractive, as it requires no extra fields in the payload of the cell. If the end-user software constrains the choice of incoming virtual circuits as indicated in the previous section, the desired effect can be accomplished without any explicit hardware support for virtual paths.

Extension of Buffer Reservation Mechanism

It turns out that the buffer reservation mechanism described in the previous section is sufficient to limit the peak rate on the virtual circuit, since the buffer reservation depends only on the virtual circuit identifiers of arriving cells, cells on a given virtual circuit will be treated in the same way, no matter which source they originate from. Hence, a single source could transmit at the virtual circuit's peak rate, consuming the entire bandwidth, or each of several sources could transmit at some fraction of the virtual circuit's peak rate. So long as the total rate of the active sources does not exceed the virtual circuit's peak rate, the cells will pass through the buffer reservation mechanism without being marked.

This is not quite the whole story however. If bursts are delineated with start and end cells in the usual way, then several bursts pass through a given link buffer concurrently, the first burst to end will cause the reserved buffers to be released, causing the other bursts to be truncated. This is illustrated in FIG. 11; in the figure, the densely shaded blocks indicate end cells. There are several possible solutions to this problem.

The first solution is to simply not use end cells to terminate bursts for those applications in which simultaneous bursts from multiple transmitters must be supported. If several bursts arrive concurrently at the same buffer, the buffer reservation mechanism will pass all of them, and release the buffers when the timeout expires after the end of the last burst. The only drawback of this approach is that it holds the buffers longer than is really necessary. This is not a significant concern if the extra holding time is a small fraction of the burst duration, but if the extra holding time is comparable to or larger than the burst duration, it can lead to a significant inefficiency.

The second solution is for the transport protocol to transmit the burst as a sequence of start cells followed by an end cell. This way, if several bursts arrive concurrently at a link buffer, the first end cell will release the buffers, but the next arriving cell in the burst will (with high probability) successfully reallocate them. There is a small chance that between the time the end cell is processed and the next cell in the burst arrives, a start cell from some other virtual circuit will reserve the buffers and prevent the original virtual circuit from reacquiring them, but this should be a fairly rare event.

A third solution involves extending the buffer reservation mechanism to that it explicitly keeps track of the number of active sources and releases the buffers only when all sources have become idle. This can be accomplished by adding a new cell type, called begin which functions like a start cell except that a source is allowed to transmit only one begin cell per burst and must match it with an end cell. The buffer reservation mechanism is extended by replacing that state bit with a counter that counts the number of unmatched begin cells seen so far. When no source is active, the counter is 0, and it is incremented upon the receipt of a begin cell, and decremented upon receipt of an end cell. Buffers are released only when the receipt of an end cell causes the counter to go to zero, or upon receipt of a timeout. A small counter, such as four bits, would probably suffice for most applications, since it should be rare that more than 15 bursts collide at a given location. This scheme is easy to implement, but does require an additional header bit to encode the begin cell type; alternatively, for virtual circuits of this type, the loner code might be reinterpreted as an end code, eliminating the need for an additional header bit.

In some applications, it may be desirable for the network to perform an explicit arbitration function, allowing just a fixed number of bursts to pass through the virtual circuit at one time and ensuring that all receivers get the same set of bursts. Several solutions to this problem are described in Melen, Riccardo and Jonathan S. Turner. "Access Arbitration in Tree Structured Communications Channels," *IEEE Transactions on Communications*, 1991. In our view, the implementation of these general solutions is too complex to justify their inclusion in the network, however there is an easily implemented and important special case that may be worth including. We propose, as an option, allowing a virtual circuit to pass a burst from only one source at a time. This can be implemented, by having each buffer reservation mechanism record, the switch input port from which the first start cell of the current burst was received, for each active virtual circuit. For cells in such a virtual circuit, only the ones coming from that input port would be allowed to pass to the output buffer; all others would be filtered out. This requires that the switch pass the number of the input port in its internal cell (something which will typically be required for other reasons in any case) and requires some additional storage in the buffer reservation mechanism. Note that the mechanism allows one burst at a time to pass through each buffer, allowing each source to send at the virtual circuit peak rate and not be concerned that collisions with other sources will cause cells from all colliding sources to be lost. However, it does not ensure that all endpoints of the virtual circuit receive the same burst when a collision occurs, only that all will receive complete (but possibly different) bursts. Ensuring that all receive the same burst calls for one of the techniques described in Melen supra.

Extension of Token Pool Mechanism

As noted above, given the concept of a common bandwidth pool shared by all sources in a multicast virtual circuit, it's necessary for the network to monitor total bandwidth usage and ensure that both the specified peak and average rates are adhered to. We have seen that the buffer reservation mechanism can adequately control the peak rate. To control the average rate requires a token pool, somewhere in the virtual circuit that monitors the total traffic on the virtual circuit rather than the traffic from a single source. This token pool can operate in much the same way as described in the last section, except that the state machine would react to start and end cells from all of the sources, not just a single source; so that if any source was active, the token pool would be drained at the virtual circuit's peak rate. Since this token pool would typically be located at some central point in the virtual circuit, it could not directly control the flow of cells from the individual sources. Therefore, when the token pool contents dropped below zero, it would send a control message on the virtual circuit releasing all buffers and causing the network interfaces at each of the sources to stop, allowing cells to pass into the network. Transmission would be re-enabled when the token pool contents became positive.

Figure 12:
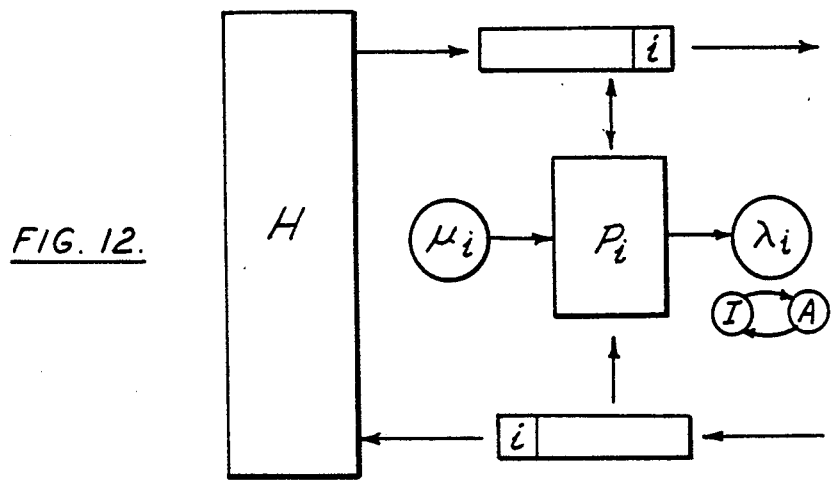
FIG. 12 is a block diagram of the modified token pool extended to monitor the total traffic on a virtual circuit.

The use of a single central token pool requires a separate control channel to carry the required control messages, making it somewhat complicated to implement. Another approach is to have a token pool at every source location, with each token pool monitoring the total traffic on the virtual circuit, but controlling the flow of cells only from it local source. This token pool 90 is illustrated in FIG. 12. The cells leaving the network affect the token pool as indicated below.

- If an outgoing start cell is received when in the idle state, enter the active state; discard the middle or end cells when idle.
- While active, remove tokens from the token pool at peak rate.
- Make transition to idle when an end cell is received or a timeout occurs.

The behavior of the token pool with respect to cells entering the network is the same as before.

Note that for outgoing cells, state transitions do not depend on the presence of tokens in the token pool. Therefore, even if the token pool contents is already negative, an outgoing start cell will cause a transition to the active state, causing the token pool contents to drop further below zero. The effect of this is to delay the next burst that the host can transmit. Note that this is appropriate, since once the outgoing cells reach the interface, they have already caused buffers to be reserved within the network and there is nothing that can be done at this interface to undo that effect. We can however, by delaying the next burst, ensure that the long term average rate on the virtual circuit is constrained to the average rate specified when the virtual circuit was established.

The use of a token pool at every interface makes the implementation simpler and more uniform than the use of a single central token pool which communicates with the network interfaces adjacent to the sources via control messages. It does have the disadvantage however that it requires the token pool associated with every source be able to observe every cell on the virtual circuit. This is no disadvantage at all in the common case where the source also expects to receive the transmissions from the other sources. It can be a disadvantage if the source wishes to transmit but not receive. Such a source can of course be accommodated by discarding the outgoing cells after they have been seen by the token pool mechanism. However, some network bandwidth must be consumed to support the measurement of the total virtual circuit traffic. In our view, this drawback, while not negligible, is acceptable, since we expect that in most multi-source virtual circuits, the sources will need to receive the transmissions from the other sources.

Implementation of Traffic Monitoring Components

In this section, we present implementation details for all the components needed to implement the traffic monitoring scheme described in the last section. Based on the proposed implementation, we derive complexity estimates that show that the incremental cost of adding resource management is acceptable.

To keep the implementation as simple as possible, we implement the buffer management mechanism only for bursty virtual circuits that have a peak rate in excess of some critical rate $\lambda^*$ ($\lambda^*$ might, for example, be 2% of the link rate). We call such virtual circuits unpredictable. Constant rate virtual circuits and bursty virtual circuits with peak rate $\leq \lambda^*$ are called predictable. By not explicitly performing buffer allocation for the predictable virtual circuits, we can substantially limit the number of virtual circuits that must be monitored at a given buffer, reducing the memory required for the lookup table.

At the same time we must take the predictable virtual circuits into account at the buffer management mechanism, even if we don't perform explicit buffer allocation for them. For constant rate virtual circuits, it suffices to reduce the available buffer slots register (B) at virtual circuit establishment time, by the virtual circuit's buffer demand $B_i$. This can be done under software control, since the buffer demand for these virtual circuits is constant.

We can do a similar thing for bursty virtual circuits with low peak rates, since it takes many such virtual circuits acting together to cause congestion. Define the effective rate of a given virtual circuit to be the link rate, R, divided by the maximum number of virtual circuits with the same average and peak rate as the given virtual circuit that can be multiplexed on the same link without exceeding the bound E on the excess buffer demand probability. Let $E_p$ be the sum of the effective rates of all the predictable virtual circuits. We define $B_p = [LE_p/R]$ to be the buffer demand for the predictable virtual circuits, where as before L is the total number of slots in the buffer and R is the link rate. We account for the predictable virtual circuits then by making at most $L - B_p$ buffer slots available to the buffer management mechanism, for use by the unpredictable virtual circuits. The cells belonging to the predictable virtual circuits bypass the buffer management mechanism, proceeding directly to the output buffer without being marked.

In the following sections, we describe implementations of the buffer management mechanism and token pool mechanisms for predictable and unpredictable virtual circuits. Different token pool mechanisms are required for the two types of virtual circuits, in order to reflect the different handling at the buffer management mechanism. We also summarize the overall complexity of the bandwidth monitoring mechanism for a configuration that appears appropriate for an ATM network with 150 Mb/s link speeds.

Buffer Management Mechanism

The buffer management mechanism is perhaps the most crucial component in the implementation of our bandwidth management and congestion control scheme. As mentioned above, we limit the overall complexity by performing explicit buffer allocation only for unpredictable virtual circuits. This allows us to implement the buffer management mechanism using a small lookup table and state machine at each output buffer of the switch. There are several factors that could be used to select the size of the table (called the Buffer Allocation Table or BAT), but we consider just one. We note that if the number of table entries is $kR/\lambda^*$, then there are enough table entries to allow us to achieve link efficiencies that are at least k times that which can be achieved using peak rate allocation alone. (This does not mean that we can always do better than peak rate allocation by a factor of k, only that the number of table entries won't prevent us from achieving such efficiencies.) Thus, if $\lambda^* = 0.02R$ and we are satisfied with say $k=5$, then 250 entries are enough.

Figure 13:
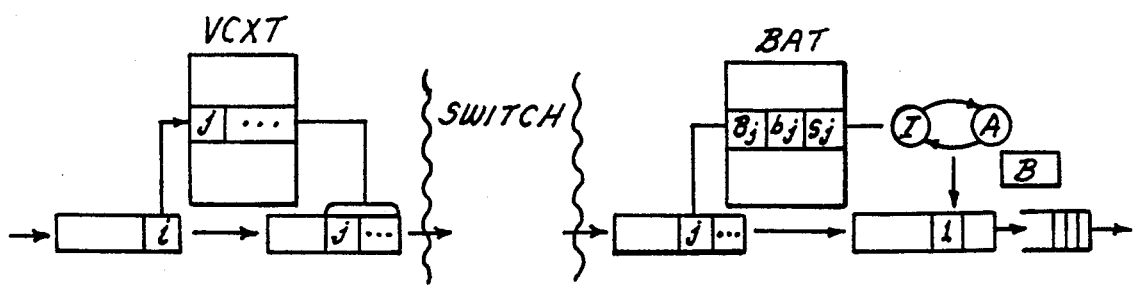
FIG. 13 is a block diagram illustrating an implementation of the buffer management mechanism.

To select an entry from the BAT, each cell passing through the switch contains an integer called the Resource Management Index (RMI). The RMI is obtained as part of the virtual circuit translation process that takes place at the input side of the switch. This is illustrated in FIG. 13, which shows a cell with VCI i arriving on the input side of the switch, and obtaining (among other things) an RMI j from the Virtual Circuit Translation Table (VCXT). After the cell passes through the switch, the RMI is used to select the appropriate BAT entry, which then drives the state machine which determines if the cell should be placed in the output buffer, and if so, whether it should be marked discardable or not. We identify predictable virtual circuits by giving them a special RMI, such as 0.

Transmit Buffer Controller

To fully implement the buffer management mechanism, we require an output or Transmit Buffer that can preferentially discard marked cells, while maintaining FIFO ordering for the cells that pass through the buffer. This requires a buffer controller similar to one described in Turner, Jonathan S. "Buffer Management System," U.S. Pat. No. 4,849,968, July, 1989. In particular, the transmit buffer controller (XMBC) consists of a set of control slots, one for each buffer slot in the transmit buffer. Each control slot includes a busy/idle flip flop (bi), an excess cell flip flop (ex), and a slot number register. The busy/idle flip flop is set for those control slots whose corresponding buffer slots contain excess (marked) cells. The slot number register identifies the slot in the buffer that a particular control slot corresponds to.

The information in the control slots is maintained in the order in which the cells are to be transmitted. This can be most easily understood by referring to the top left hand portion of FIG. 14. Each column in the table represents one control slot; in the example shown, there are eight control slots, which would be sufficient for a buffer containing up to eight cells. The configuration at top left, corresponds to a buffer in which five of the eight buffer slots are occupied by cells, and the cells to be transmitted are those in slots 2, 5, 1, 3 and 7. The transmission order is right to left. Notice that the cells in slots 5 and 3 have their excess flip flops set, meaning that they may be overwritten. Also notice that slot numbers are maintained even for those control slots whose busy/idle flip flops are cleared.

The figure shows a sequence of operations and the resulting state of the XMBC following each of those operations. The first operation is a read, which causes the cell in buffer slot 2 to be read from the buffer and the slot number to be recycled into the last control slot. The second operation is a write, in which the incoming cell is marked. The cell is written into the rightmost idle slot (slot 0) and the busy/idle and excess flip flops are both set. The next several operations are similar. After the buffer becomes full, an overwrite operation is performed. In this operation, the leftmost excess cell is removed from the XMBC, the slots to its left shift right one position, then the new cell is placed at the end of the buffer using the slot number previously occupied by the excess cell.

Figures 14, 15:
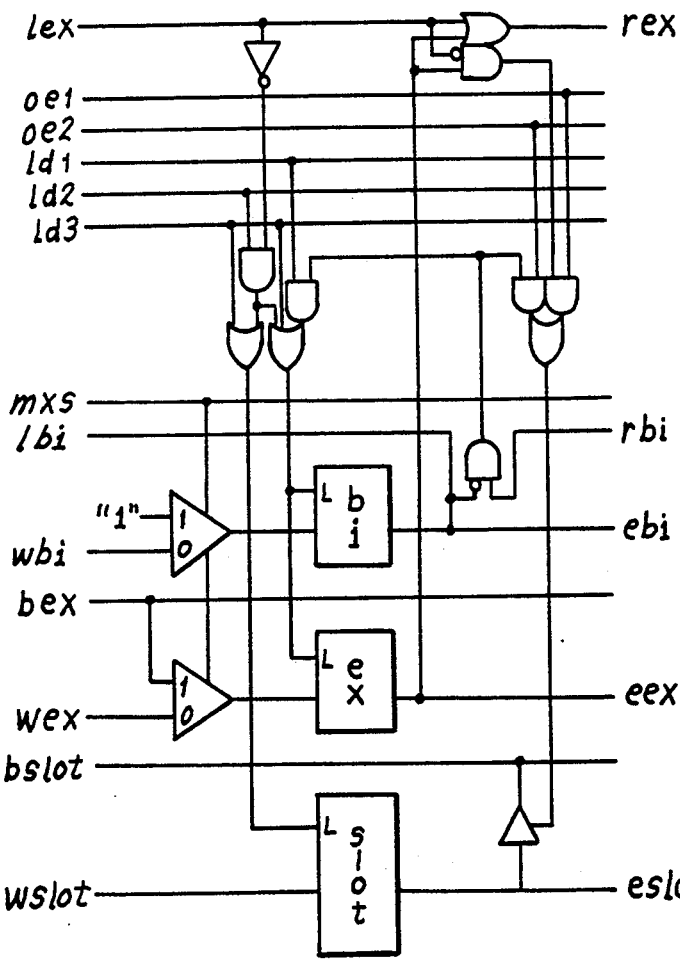
FIG. 14 is a set of tables illustrating the operation of a transmit buffer controller.
FIG. 15 is a schematic diagram of a transmit buffer control slot.

FIG. 15 gives a circuit that can be used to implement a typical XMBC control slot. The busy/idle and excess flip flops as well as the slot register appear toward the bottom of the figure. A series of control signals along with per slot control logic determines the operation of each slot. The various signals are described briefly below.

Left Excess (lex). This signal is asserted if there is a control slot to the left of the current one that includes an excess cell.

Right Excess (rex). This output is connected to the right neighbors's lex input.

Output Enabl 1 (oe1). This signal is asserted during an overwrite operation to obtain the slot number that the arriving cell is to be written. to.

Output Enable 2 (oe2). This signal is asserted during a write operation to obtain the slot number that the arriving cell is to be written to.

Load 1 (ld1). This signal is asserted during a write operation to set the busy/idle flip flop and load the excess flip flop of the rightmost idle control slot.

Load 2 (ld2). This signal is asserted during an overwrite operation to load those control slots whose lex input is low, from their left neighbors.

Load 3 (ld3). This signal is asserted during a read operation to load all control slots from their left neighbors.

Mux Select (mxs). This signal controls the input multiplexors on the busy/idle and excess flip flops.

Left/Busy Idle (lbi). Output of the slot's busy/idle flip flop.

Right/Busy Idle (rbi). Output of the right neighbor's busy/idle flip flop.

West Busy/Idle (wbi). Output of the left neighbor's busy/idle flip flop.

East Busy/Idle (ebi). Output of the slot's busy/idle flip flop.

Bus Excess (bex). This line is used to load the excess flip flop of the rightmost idle slot during a write operation.

West Excess (wex). Output of the left neighbor's excess flip flop.

East Excess (eex). Output of the slot's excess flip flop.

West Slot (wslot). Output of the left neighbor's slot register.

East Slot (eslot). Output of the slot register.

Figure 16:
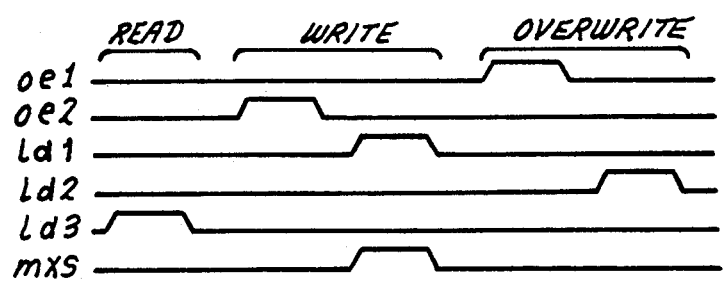
FIG. 16 is a timing diagram of the transmit buffer control signals for the implementation illustrated in FIG. 15.

A timing diagram is given in FIG. 16 showing how the various control signals are used to implement the read, write and overwrite operations. We estimate the complexity of one slot at approximately 180 transistors, assuming a CMOS implementation and an eight bit slot number. Since a control slot is required for each cell and a cell consumes 424 bits of memory (which will typically be a static memory, implying six transistors per bit), this appears to be an acceptable overhead relative to the inherent cost of storage. Note that the leftmost and rightmost control slots in the XMBC are implemented slightly differently.

Timers

Another central element of the buffer management mechanism is a set of timers for ensuring an eventual return to the idle state. A separate timer is required for every unpredictable virtual circuit that is in the active state. If $\lambda^* = 0.02$, then 50 timers are sufficient. The timer bank can be implemented using a circuit that is very similar to the one used in the XMBC. For each timer, there is a slot containing a busy/idle flip flop, a time register, which gives the time at which the particular timer is to expire, and an RMI register which identifies the RMI that the given timer is associated with.

The timer slots are maintained in time order, so that the "rightmost" timer in the timer bank is the next one to expire, the one to its left will expire after that, and so forth. When the current time matches the time value in the rightmost timer's register, the buffers associated with that RMI are deallocated and the timer is released. Releasing the timer is accomplished by shifting the values in all the timer slots to the right one position. When an idle timer must be allocated, the rightmost idle slot is identified and the time at which it is to expire plus the RMI are loaded into the slot. When a timer must be reset, the RMI of the timer to be reset is placed on a bus and compared with all the stored RMI values. The slot with the matching RMI and those to its left load new values from their left neighbors. This effectively deallocates that slot; to complete the operation, the rightmost idle slot is allocated and its time and RMI registers appropriately initialized.

Figure 17:
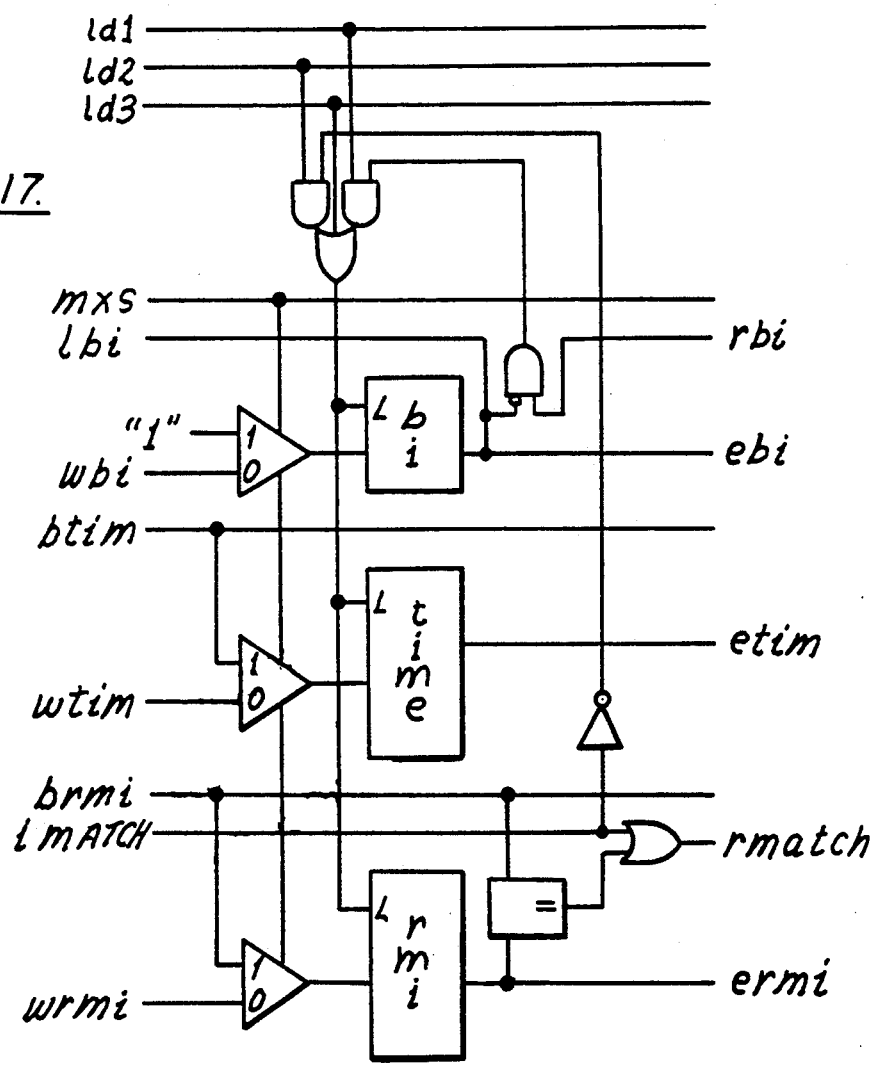
FIG. 17 is a schematic diagram of an implementation of a timer slot circuit.

A circuit implementing a typical timer slot is shown in FIG. 17. It is very similar to the XMBC circuit described earlier. The Left Match (lmatch) signal is asserted if any of the slots to the left of the current slot have the same RMI as the one currently on the RMI bus (brmi). The Right Match (rmatch) output connects to the right neighbor's lmatch input. Assuming that eight bits are sufficient for the time and another eight for the RMI, the estimated circuit complexity of the timer slot is approximately 340 transistors.

Integrating Resequencer, Buffer Manager and Transmit Buffer Controller

Turner, Jonathan S. "Resequencing Cells in an ATM Switch," Washington University Computer Science Department technical report, WUCS-92-21,2/91 describes a mechanism for resequencing cells after they pass through an ATM switch to ensure that they exit the system in the same order they enter. Such a resequencer is necessary in a system such as the one described in Turner, Jonathan S. "Design of a Broadcast Packet Network," *IEFF Transactions on Communications*, June 1988 where the core switching network does not necessarily preserve cell ordering. The resequencer in Turner, Jonathan S."*Resequencing*", supra, stores some data for each cell held in a resequencing buffer, including the age of the cell and the buffer slot in which it is stored. During each operation cycle, the "oldest" cell in the resequencer is examined and if it is older than some system-specified threshold and if the downstream circuitry is prepared to accept it, its slot number is used to read the cell from the buffer and it is then sent to the downstream circuitry. The resequencer includes circuitry for selecting the oldest cell in an efficient way.

Turner, "*Resequencing*", supra, also describes a version of the resequencer in which the resequencing buffer and a larger transmit buffer share a common random access memory for cell storage, and keep track of which cells are in the resequencing buffer and which are in the transmit buffer by exchanging records that include the slot numbers of cells stored in the two buffers. The transmit buffer in Turner, "*Resequencing*", supra, however, is a simple FIFO buffer, and does not support overwriting of excess cells. We now describe an extension of the earlier scheme that integrates a resequencer, the buffer management mechanism and the transmit buffer in a common control circuit.

Figure 18:
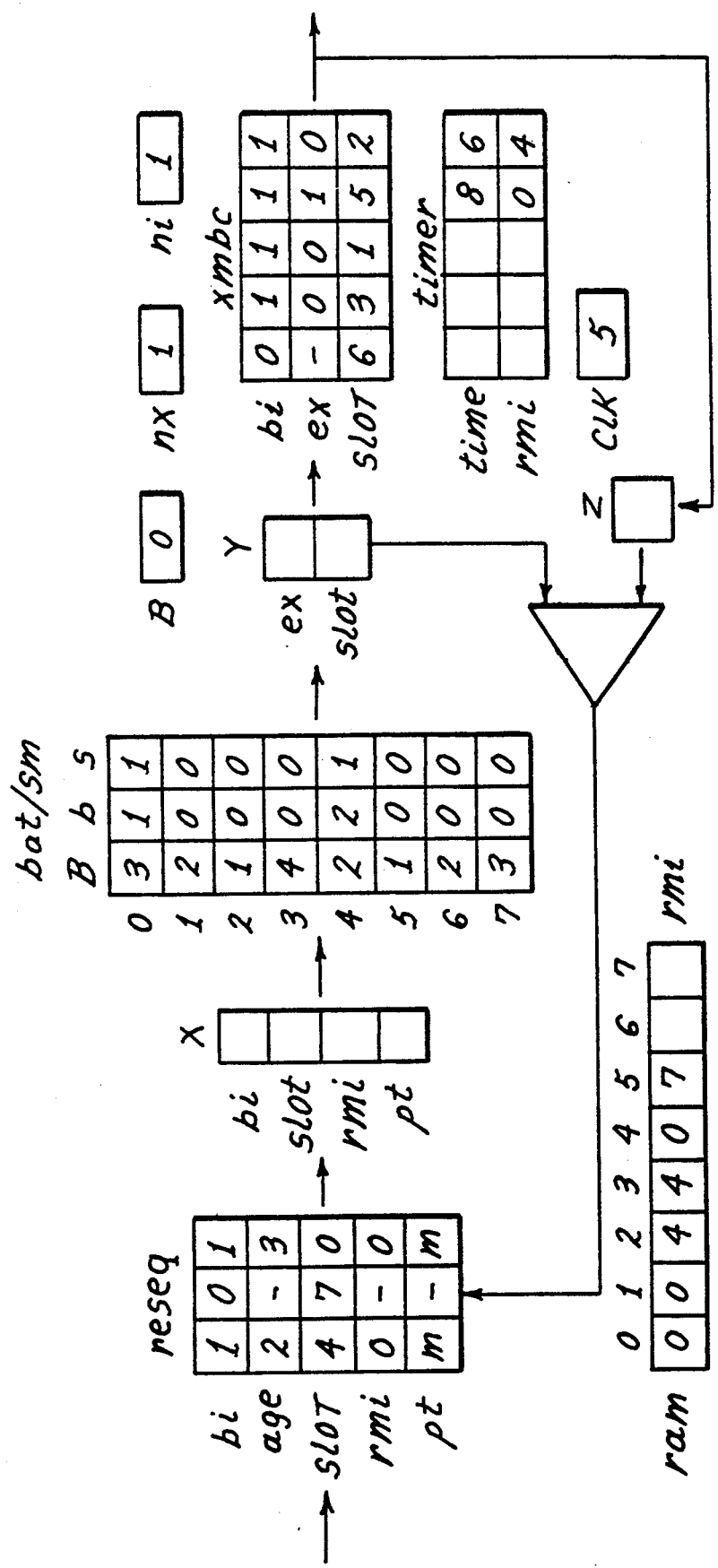
FIG. 18 is a set of tables which illustrate the overall organization of an integrated buffer controller.

FIG. 18 illustrates the overall organization of the integrated buffer controller through an example. In this example, the combined buffer can store eight cells, three in the resequencer and five in the XMBC. (Note that to keep the example manageable, we have assumed that the entire buffer is available for use by the unpredictable virtual circuits.) The resequencer appears at the left side of the figure. Each column in the resequencer represents a slot associated with a single cell in the buffer. The busy/idle bit in the resequencer is set for those slots that correspond to actual cells in the memory. The age field gives the age of the stored cell. The slot number field specifies the buffer slot in which the cell is stored. The RMI field gives the resource management index of the stored cell. The pt field gives the type (start, middle, end or loner) of the stored cell. Directly below the resequencer in the figure is the random access memory in which the cells are stored. The numbers shown here are the RMIs of the stored cells.

At the center of the figure is the Buffer Allocation Table and State Machine (BAT/SM). Each row in the table corresponds to a distinct RMI value and the entry in row i includes the buffer demand when busy ($B_i$), the number of unmarked cells currently in the transmit buffer ($b_i$) and the state of the virtual circuit ($s_i$).

At the right of the figure is the Transmit Buffer Controller (XMBC), with each column representing a slot in the buffer, with a busy/idle bit an excess bit and a slot number for each slot. Above the XMBC are three registers. The one labeled B gives the number of XMBC buffer slots that are currently not allocated to any virtual circuit. The one labeled nx gives the number of excess cells currently in the XMBC. The one labeled ni gives the number of idle slots currently in the XMBC. There are three temporary holding registers, labeled X, Y and Z whose use will be described shortly. Below the XMBC is a timer bank which includes the time at which each timer is to expire, along with the RMI of the virtual circuit associated with that timer. Below the timer is a clock that gives the current time.

By examining the figure, one can deduce that the resequencing buffer currently contains two cells and these are stored in slots 0 and 4 of the RAM. The XMBC contains four cells, stored in slots 2, 5, 1 and 3 of the RAM, one of which is an excess cell. There are two active virtual circuits currently, those with RMIs 0 and 4, and all five of the XMBC slots are allocated to these virtual circuits, although only three are currently being used by them.

The operation of the buffer controller comprises three phases. During the first phase, a cell is sent from the transmit buffer, and information about the next cell to exit the resequencing buffer is loaded into register X. During the second phase, an entry is read from the buffer allocation table and the state machine processing is performed. During the third phase, an incoming cell is loaded into the resequencer. A more detailed description follows.

Phase 1

Read the oldest busy slot from the resequencer and put the information in X if the age of the oldest slot exceeds the age threshold and if there is an idle slot or an excess slot in the XMBC.

Read the first slot from the XMBC, then read the stored cell from the RAM and transmit it; if the downstream circuitry acknowledges the transmitted cell (meaning that it accepts it), mark the slot as idle and reinsert it into the XMBC, then update nx, ni and the b field of the BAT as appropriate.

Phase 2

If X.bi=1, read the BAT entry indicated by X.rmi. Use the entry to simulate the state machine. If the cell should be discarded, clear X.bi. Otherwise, if the cell should be marked as excess, set Y.ex and transfer the slot number to Y.slot; also, add 1 to the b field of the BAT and reset the timer.

Copy the slot number of the rightmost idle slot, or if there is no idle slot, the leftmost excess slot in the XMBC, to Z.

Increment the age fields in the resequencer.

Phase 3

If X.bi=0, place the incoming cell (if any) in any idle resequencer slot; discard if no idle slot available or if the incoming cell's age exceeds the age threshold.

If X.bi=1 and the XMBC has an idle slot, copy information from Y to the rightmost idle position in the XMBC and insert the slot number in Z into the resequencer in the position previously occupied by the slot just removed from the resequencer.

If X.bi=1 and the XMBC has no idle slot and Y is an excess slot, insert the slot number from Y into the resequencer in the position previously occupied by the slot just removed from the resequencer.

If X.bi=1 and the XMBC has no idle slot and Y is not an excess slot, shift over the leftmost excess slot, copy the information from Y into the vacated position and insert the slot number Z into the resequencer.

Process timeouts.

FIG. 19 illustrates the operation of the buffer controller by showing how the contents of the various element changes in each of the three phases. By following through the example, using the description given above, the reader can gain a working understanding of the buffer controller's operation.

Token Pool Mechanism for Predictable Virtual Circuits

As noted above, it's useful to classify the virtual circuits into two groups, predictable and unpredictable. The predictable class includes constant rate virtual circuits and bursty virtual circuits with a small peak rate. While explicit buffer management is performed only for the unpredictable virtual circuits, both classes must be monitored at the access of the network to ensure that the traffic within the network is consistent with what was assumed at the time the virtual circuits were established. In this section, we describe the use of a token generation mechanism for handling the predictable traffic and describe its implementation in some detail. We start by assuming a virtual circuit that is either point-to-point or involves a single transmitter. We'll then extend this to the multi-source case.

To control a constant rate virtual circuit, we need only monitor the peak rate. For bursty virtual circuits, we must monitor both the peak and the average. In section 1, a peak rate monitoring mechanism was described briefly. The mechanism consists of a real time clock and, a lookup tale containing, for each monitored virtual circuit i, the minimum inter-cell spacing $d_i$ and the time at which the most recent cell was transmitter $t_i$. When a cell is received, we simply verify that the difference between the current time T and $t_i$ is at least $d_i$. As mentioned earlier, this simple approach has the drawback that it effectively limits us to peak rates of the form R/j where R is the link rate and j is a positive integer. This is not a problem if the peak rate is not too large. For example, for peak rates that are less than 2% of the link rate, there seems little reason not to use the simple mechanism. For virtual circuits with larger peak rates, we can replace the simple peak rate monitor by a token pool mechanism with a token generation rate equal to the peak rate of the connection and a fairly small token pool capacity.

We now consider how one can most efficiently implement the token pool mechanism. Define $\gamma_i$ to be the normalized token generation rate. That is, $0 < \gamma_i \leq 1$ and tokens are generated at the rate of $\gamma_i x$ (the maximum cell transmission rate on the line). Let $P_i$ be the maximum number of tokens that a token pool can hold, let $Q_i$ be the number of tokens in the token pool at a particular time and let $t_i$ be the time at which the last cell was added to the token pool. We also let T be the current time. Assuming the quantities $\gamma_i$, $P_i$, $Q_i$ and $t_i$ are stored in a lookup table in the interface hardware, then whenever the user sends a cell associated with connection i we execute the following algorithm $$Q_i := Q_i + (T - t_i)\gamma_i; Q_i := \min\{P_i, Q_i\}; t_i := T;$$
$$\text{if } Q_i \geq 1 \rightarrow Q_i := Q_i - 1; \text{Pass cell};$$
$$| Q_i < 1 \rightarrow \text{Mark and pass cell; Generate flow control cell};$$
$$\text{fi}$$

The increment added to $Q_i$ in the first line, is the number of tokens that would have been added to the token pool between the time the last cell was processed and the current time if tokens were added continuously. Note however, that as we have organized things, there is no need to add tokens continuously to all the active virtual circuits. It is sufficient to update the variables for a virtual circuit when a cell is received. Note that if the token pool is empty, the cell is marked as discardable, allowing the network to throw it away if congestion is encountered enroute. Also notice that a flow control cell is generated and sent back to the user whenever a cell is marked. Flow control cells could also be generated if $Q_i$ is below some threshold.

Note that since $0 < \gamma_i \leq 1$, the increment added to $Q_i$ need not be an integer. To make things work properly, it is in fact necessary to keep track of "fractional tokens." While fixed point arithmetic can be used, we do need to consider the question of what precision is required. The choice of precision constrains the value of $\gamma_i$ if we are to avoid loss of tokens due to round-off errors. Specifically, if we use k bits to represent fractional tokens, the value of $\gamma_i$ must equal $j/2^k$ for some positive integer j. Even a modest value of k (like 4) would probably provide enough precision to represent large token generation rates adequately. Small token generation rates however, require many bits of precision. Also, note that the multiplication required to calculate x requires multiplication hardware. While this is not too expensive if k is small (since only k partial products need be produced and summed), it can be quite expensive when k is large.

We can solve both of these problems by making the precision a function of $\gamma_i$. Specifically, we introduce the notion of a minitoken, where each token contains exactly $2^k/\gamma_i$ minitokens, with k positive integer. The algorithm to implement the token pool mechanism can now be restated in terms of minitokens as indicated below. In this version, $Q_i$ gives the number of minitokens in the token pool and $P_i$ is the bound on the number of minitokens.

$$Q_i := Q_i + (T - t_i)2^k; Q_i := \min\{P_i, Q_i\}; t_i := T;$$
$$\text{if } Q_i \geq 2^k/\gamma_i \rightarrow Q_i := Q_i - 2^k/\gamma_i; \text{ Pass cell}$$
$$| Q_i < 2^k/\gamma_i \rightarrow \text{Mark and pass cell; Generate flow control cell;}$$
$$\text{fi}$$

To implement this efficiently, the lookup table stores $2^k/\gamma_i$, as well as $P_i$, $Q_i$ and $t_i$; k can be fixed for all virtual circuits, making it unnecessary to store it. Notice that the multiplication that appears in the first line is really just a shift by a fixed value, so no hardware multiplier is needed. To avoid loss of minitokens due to roundoff error, we must constrain the token generation rate $\gamma_i$ to be of the form $2^k/h$ where h is an integer $\geq 2^k$. So for example, if k=8, allowed values of $\gamma_i$ include 256/256, 256/257, 256/258, .... The constraint on $\gamma_i$ defines the precision with which we can represent a user-specified rate. What then, is the maximum difference between a user specified rate and the next rate that satisfies our constraint. Well, the absolute difference between a user-specified rate and the next larger rate that satisfies the constraint is at most $$\frac{2^k}{h} - \frac{2^k}{h+1} = \frac{2^k}{h(h+1)} \leq \frac{1}{2^k+1}$$

since $h \geq 2^k$. Similarly, the relative difference is at most $$\frac{(2^k/h) - (2^k/(h+1))}{2^k/(h+1)} = \frac{1}{h} \leq \frac{1}{2^k}$$

Hence if k=8, the difference between a user-specified rate z and the rate actually used is at most z/256.

It's also important to consider the number of bits needed to represent the various quantities stored in the lookup table. The number of bits used to represent $P_i$ determines the maximum time duration of a data burst. If we use r bits to represent $P_i$, then for a 150 Mb/s link, supporting an ATM cell rate of $\approx 350,000$ cells per second, we can allow burst durations of up to $2^r/(2^k \times 350,000)$ seconds; for r=32 and k=8 this is about 48 seconds. The same number of bits is needed to represent $Q_i$. The number of bits used to represent the quantity $2^k/\gamma_i$ constrains the minimum token generation rate. In particular, if r bits are used, the minimum token generation rate is a least $2^k/2^r$, so if k=8, we need 24 bits in order to represent token generation rates corresponding to data rates of 2 Kb/s. The number of bits used to represent $t_i$ constrains the maximum time between cell transmissions. If r bits are used, and the link rate is 150 Mb/s, the maximum time between cell transmissions is $\approx 2^r/350,000$ seconds. So for example, if r=24, the time between cell transmissions can be as long as 48 seconds. While we cannot guarantee that a user will send cells often enough to ensure that this constraint is met, we note that the consequences of a failure to do so are sufficiently benign that it seems unnecessary to provide any additional mechanism to protect against this case. The effect is just that the increment added to $Q_i$ in the first line of the algorithm is incorrect, meaning that fewer minitokens are added to the token pool than should be.

From this discussion, it appears that a token pool used to monitor the average rate of a virtual circuit can be implemented using k=8, 32 bits each for the representation of $P_i$ and $Q_i$ plus 24 bits each for $2^k/\gamma_i$ and $t_i$; this gives a total of 14 bytes. A token pool used to monitor a virtual circuit peak rate that is greater than 2% of the line rate, can be implemented using fewer bits. In particular, if we use k=6, 12 bits each appears sufficient for $P_i$ and $Q_i$, 6 bits are sufficient for $2^k/\gamma_i$; this gives a total of 5 bytes.

We now consider how the token pool mechanism must be modified to cope with virtual circuits in which there are multiple sources. As discussed earlier, we view the bandwidth available to such a virtual circuit as being a common bandwidth pool that all the sources share. To accommodate this view, each token pool monitors both traffic entering the network and traffic exiting. This means that during each operational cycle, the token pool cell and an outgoing cell. The algorithm already described gives the processing for incoming cells. The algorithm to process outgoing cells appears below.

$$Q_i = Q_i + (T - t_i)2^k;$$

$$Q_i = \min\{P_i, Q_i\};$$

$$t_i = T;$$

$$Q_i = Q_i - 2^k/\gamma_i;$$

Token Pool Mechanism for Unpredictable Virtual Circuits

Recall that for unpredictable virtual circuits, the switches through which the virtual circuit passes perform explicit buffer allocation. To ensure that buffers are not held longer than was expected at virtual circuit configuration time, the token pool mechanism at the user-network interface must include a state machine that mimics that state machine in the buffer allocation mechanism. As discussed, earlier, this state machine drains the token pool at the peak rate $\gamma_i$, while the virtual circuit is active. As in the case of the simple token pool mechanism, we would like to simulate the effect of this draining at the time a cell is received, rather than provide hardware to continuously drain the token pool. We also of course need to add tokens to the token pool at the average rate $\mu_i$.

The fact that we must both add and remove tokens from the token pool at different rates, complicates the token pool somewhat. In particular, if we use the approach described above, we define a token to consist of $2^k/\mu_i$ minitokens and then whenever a cell is received from the user, we add $(T-t_i)2^k$ minitokens to the token pool. This is equivalent to adding $(T-t_i)\mu_i$ tokens. If the virtual circuit is active, we must also remove $(T-t_i)\lambda_i$ tokens from the token pool or $2^k(\lambda_1/\mu b)$ minitokens. Unfortunately, this implies that we must multiply $(T-t_i)$ times $2^k(\lambda_i/\mu_i)$. To limit the complexity of the circuit required for this multiplication, we can constrain $\lambda_i/\mu_i$ to be of the form $z2^h$, where z is an integer that can be represented in a small number of bits say 4 and h is also an integer possibly negative. The hardware required for the multiplication is then relatively simple. If z has four bits, then we can perform the multiplication with three additions and a shift.

There are two other respects in which the token pool mechanism for unpredictable virtual circuits is more complicated than the one for predictable virtual circuits. First, it must implement a state machine similar to the one in the switches, and process cells according to the status of the state machine. Second, it must include a timer bank to enforce an eventual transition from the active to idle state. As a result, the token pool for unpredictable sources must perform up to three processing steps in each operational cycle; one for cells entering the network, one for cell exiting the network and one for processing expired timers. The algorithm for processing entering cells appears below. The symbols $P_i$, $Q_i$, $t_i$, $\mu_i$, $\lambda_i$ and k have the same interpretation as previously (note that normalized rates are used here). The quantities $z_i$ and $h_i$ define the multiplier to use when removing minitokens from the token pool, as just discussed. The variable $s_i$ is the state variable and pt gives the type (start, middle, end or loner) of the cell being processed.

```
Q_i := Q_i + (T - t_i)2^k;
if s_i = active →
    Q_i := Q_i - (T - t_i)z_i2^{hi-k};
fi;
Q_i := min {P_i,Q_i}; t_i := T;
if pt = loner → pass cell
| pt ≠ loner    s_i = idle →
    if pt ≠ start    Q_i < 2^k/μ_i    no timers are
                                       available →
        discard cell;
    | pt = start    Q_i ≥ 2^k/μ_i    there is a timer
                                       available →
        s_i := active; initialize idle timer; pass
        cell;
    fi;
| pt ≠ loner    s_i = active →
    if Q_i ≥ 2^k/μ_i →
        reset timer; pass cell;
    | Q_i < 2^K/μ_i →
        pt := end; s_i := idle;
        deallocate timer; pass cell;
    fi;
fi;
```

The algorithm for processing exiting cells is similar.

```
Q_i := Q_i + (T - t_i)2^k;
if s_i = active →
    Q_i := Q_i - (T - t_i)z_i2^{hi-k};
fi;
Q_i := min {P_i,Q_i}; t_i := T;
if pt = loner → pass cell;
| pt = start    s_i = idle    there is a timer
                              available →
    s_i = active; initialize idle timer; pass cell;
| pt = start    s_i = idle    there is no timer
                              available →
    discard cell;
| pt ∈ {middle, end}    s_i = idle →
    discard cell;
| pt ≠ loner    s_i = active →
    reset timer; pass cell;
fi;
```

The algorithm to process timers appears below.

```
if T ≥ expiration timer of first timer in timer
       bank →
    let i be RMI of first timer;
    s_i := idle;
    deallocate timer;
fi;
```

To dimension the lookup table needed to store the various quantities needed to implement the token pool mechanism, we must decide how many bits are needed for each quantity. For ATM networks with 150 Mb/s links, and following earlier discussion, 32 bits each are needed for $P_i$ and $Q_i$ and 24 bits are probably sufficient for $t_i$ and $2^k/\mu_i$. The only additional quantities required are $s_i$ (one bit) and $z_i$ and $h_i$. To keep the multiplication simple and fast, $z_i$ must be quite small, say 4 bits and six bits are enough for $h_i$. Hence, sixteen bytes per entry is sufficient. While this is not insignificant, because the token pool mechanism is needed only at the user-network interface, the number of separate token pool mechanisms that must be implemented is probably limited. If for example, we supported 64 token pool mechanisms for unpredictable virtual circuits at the user-network interface, the total memory requirement would be about 10 Kbits, which is small enough that it could be incorporated directly onto a user-network interface chip.

Summary of Implementation Complexity

As we have seen, there are three essential hardware components to our buffer management and congestion control scheme; the buffer allocation mechanism, the token pool mechanism for predictable virtual circuits and the token pool mechanism for unpredictable virtual circuits.

The buffer allocation mechanism includes the buffer allocation table, the transmit buffer controller and the timers. We will also consider the resequencer complexity, even though this is not really part of the buffer allocation mechanism. As an example, assume a 256 entry BAT, and a 256 slot buffer divided between the resequencing buffer (64 slots) and the transmit buffer. Following Turner, Jonathan S. "Resequencing Cells in an ATM Switch," Washington University Computer Science Department technical report, WUCS-91-21,2/91 we estimate the cost of one resequencing buffer slot at 450 transistors. This includes 100 transistors to account for the extra storage needed to hold the RMI and pt fields of the cell. The BAT would require 17 bits per entry or 102 transistors per entry, assuming a conventional static RAM. As discussed above, the XMBC requires about 180 transistors per slot and the timers require about 340 transistors each. If we allow for 64 timers, the overall complexity of the buffer allocation mechanism is approximately $64\times450+256\times102+192\times180+64\times340\approx111,000$ That is, roughly 111,000 transistors are needed to implement the buffer allocation mechanism and the resequencer. This neglects the circuits to implement the various registers and state machines also required. We estimate that including these would bring the overall complexity to roughly 125,000 transistors. The cost of a resequencer and transmit buffer controller that do not support buffer allocation is 350 transistors per resequencer slot and 64 transistors per XMBC slot (following Turner supra); this gives a total of about 35,000 transistors. If we subtract this from the cost derived above, we get 90,000 transistors as the incremental cost of adding the buffer allocation mechanism. The buffer required to store 256 ATM cells, on the other hand, requires about 650,000 transistors (assuming static memory), so the incremental cost of the buffer management mechanism is approximately 14% when measured in transistor count. When measured in chip area, the incremental cost is perhaps closer to 30%.

For predictable virtual circuits, the user network interface must implement two token pool mechanism, one to monitor the peak rate and one to monitor the average rate. Most of the cost of these token pool mechanisms is in the memory. Following the discussion above, 14 bytes appears sufficient for monitoring the average rate and 5 for monitoring the peak. For unpredictable virtual circuits, the user network interface need only monitor the average rate, since the buffer management mechanism in the switch effectively controls the peak rate. The amount of memory needed in this case is 18 bytes per monitored virtual circuit. If 64 virtual circuits of each type are monitored at the user-network interface, the implementation complexity is $\approx 64 \times 6 \times 8 \times (18+14+5) \approx 113,664$ transistors. The timers needed for the unpredictable virtual circuits add another $64 \times 340 \approx 22,000$ and the circuitry to implement the state machines and other overhead circuits would probably bring the total to about 160,000 transistors. While this is not insignificant by any means, it is well within the capabilities of current technology, particularly when one considers that the majority of this circuitry is memory. Application-specific integrated circuits (ASIC) with complexities in the neighborhood 500,000 transistors are not uncommon, meaning that the token pool mechanisms could be integrated on a custom user-network interface chip along with other control circuitry.

While the present invention has been described by reference to specific embodiments, it should be understood that modifications and variations of the invention may be constructed without departing from the scope of the invention defined in the following claims.

What is claimed is:

1. An ATM network comprised of a plurality of data links interconnecting a plurality of network switches, each of said data links having a maximum bandwidth, and a plurality of data terminals connected by associated data links to said network switches in said network, said network having means for selectively establishing a virtual circuit therethrough over which data bursts comprised of one of more cells may be routed from at least one data terminal to at least one other data terminal, each of said cells being encoded, each of said data links having a buffer means for receiving and storing cells in buffer slots prior to transmission over its associated data link, and a state machine associated with each virtual circuit, said state machine having means for monitoring the number of unallocated slots in said buffer, means for determining how many unallocated slots are required for transmitting one of said bursts, means for comparing said number of unallocated slots with said required number of unallocated slots, and means for allocating a plurality of unallocated buffer slots to a plurality of cells comprising a burst in response to said comparing means, said state machine having means for decoding each cell and determining at least partially in response to said cell encoding and said buffer slot comparing means whether it should be passed to said associated buffer for guaranteed transmission over its associated data link to thereby maximize the throughput of a matched plurality of encoded cells (burst) by minimizing the undesired truncating of a portion of said bursts.

2. The network of claim 1 wherein said state machine is always in either a transmitting state or a blocking state, said transmitting state being characterized by the passing of cells to its associated buffer and said blocking state being characterized by the discarding of cells, and said state machine has means for changing from one of said states to the other of said states in response to said cell encoding and said buffer slot comparing means.

3. The network of claim 2 wherein said cell encoding corresponds to the start (s), middle (m), or end (e) or an acceptable sequence of a plurality of cells comprising a burst, or a loner cell which is a low priority single cell, and said state machine has means for changing state solely in response to said (s) or (e) encoded cells.

4. The network of claim 3 wherein said state machine further comprises means for limiting the time duration of each of said transmitting states.

5. The network of claim 4 wherein a plurality of data terminals are permitted to transmit over the same virtual circuit and wherein said cell encoding further comprises a begin (b) code which corresponds to an (s) encoded cell except that each of said data terminals is constrained to include only one (b) encoded cell for each burst, and each (b) encoded cell has a matched (e) encoded cell, and wherein said state machine further comprises means for remaining in a transmitting state upon receipt of an (e) encoded cell unless a like number of (b) encoded cells have been received during the same transmitting state.

6. The network of claim 1 wherein said virtual circuit establishing means comprises means for establishing a new virtual circuit in response to the probability that the demand for buffer slots exceeds the available supply being less than E, wherein E is a pre-selected value.

7. The network of claim 6 wherein said virtual circuit establishing means has means for calculating said probability as a function of each virtual circuit's peak data rate and average data rate.

8. The network of claim 1 wherein each data terminal further comprises means for limiting the average data rate of data sought to be transmitted through said network by each data terminal.

9. The network of claim 8 wherein said average data rate limiting means comprises a state dependent token pool mechanism (SDTPM), said SDTPM having means for generating tokens into a token pool at a pre-selected average data rate when active or idle, means for subtracting tokens from said token pool at a pre-selected peak rate when active, and means for passing or discarding data cells at least partially in response to the presence or absence of tokens in said token pool.

10. The network of claim 9, wherein said data cell passing or discarding means is at least partially responsive to a pre-determined time delay.

11. The network of claim 10 wherein said SDTPM has means for changing a data cell encoding to (e) if upon receipt thereof the number of tokens in said token pool is zero or less.

12. The network of claim 11 wherein said SDTPM is always in either a transmitting state or a blocking state, said transmitting state being characterized by the passing of cells to its associated buffer and said blocking state being characterized by the discarding of cells, and said SDTPM has means for changing from one of said states to the other of said states in response to said cell encoding.

13. In an ATM network comprised of a plurality of data links interconnecting a plurality of network switches, and a plurality of data terminals connected by associated data links to said network switches in said network, each of said data links having a plurality of buffer slots, the improvement comprising means for selectively establishing a new virtual circuit therethrough in response to the computed probability that the instantaneous demand for the buffer slots associated with the data links comprising the new virtual circuit exceeds the supply is less than a pre-determined value.

14. The device of claim 13 wherein said virtual circuit establishing means comprises means for establishing a new virtual circuit through each network switch, each of said data links and network switches having a buffer with a plurality of slots into which all data must be stored prior to transmission over said data link or switch, and wherein said virtual circuit establishing means includes means for computing the probability distribution of buffer load to be experienced after establishment of said new virtual circuit.

15. The device of claim 14 wherein said virtual circuit establishing means includes means for computing the probability distribution of buffer load in terms of its peak data rate and average data rate, and without regard to the length of data bursts.

16. In an ATM network comprised of a plurality of data links interconnecting a plurality of network switches, each of said data links and network switches having an associated buffer through which data must pass prior to entering said associated data link or network switch, and a plurality of data terminals connected by associated data links to said network switches in said network for transmission and reception of data over said network, the improvement comprising means for limiting the average data rate of data sought to be transmitted through each of said buffers by each of said data terminals comprising a state dependent token pool mechanism (SDTPM), said SDTPM having means for generating tokens into a token pool at a preselected average data rate when active or idle, means for substracting tokens from said token pool at a preselected peak rate when active, and means for passing or discarding data cells at least partially in response to the presence or absence of tokens in said token pool.

17. The device of claim 16 wherein said data cell passing or discarding means is at least partially responsive to a pre-determined time delay.

18. The device of claim 17 wherein said SDTPM has means for truncating the transmission of related data cells if upon receipt thereof the number of tokens in said token pool is zero or less.

19. The device of claim 18 wherein said SDTPM is always in either a transmitting state or a blocking state, said transmitting state being characterized by the passing of cells to its associated buffer and said blocking state being characterized by the discarding of cells, and said SDTPM has means for changing from one of said states to the other of said states in response to an encoding present in said cells, said cell encoding corresponding to the relative position of each of said cells in a data burst comprised of a plurality of cells.

20. In an ATM network comprised of a plurality of data links interconnecting a plurality of network switches, and a plurality of data terminals connected by associated data links to said network switches in said network for transmitting or receiving data over said network, and means for establishing virtual circuits interconnecting said data terminals over said network through which said data is transmitted and received, the improvement comprising means associated with each data link for monitoring and controlling the peak data rate and average data rate through each virtual circuit to thereby manage the bandwidth over each data link, said data link monitoring and control means comprising a buffer reservation mechanism and a token pool mechanism, said buffer reservation mechanism having means for controlling the peak data rate transmitted through an associated virtual circuit, and said token pool mechanism having means for monitoring and controlling the average data rate through an associated virtual circuit.

21. The device of claim 20 wherein said virtual circuit establishing means comprises means for establishing a new virtual circuit over said network in response to the computed probability that said load resulting from said new virtual circuits would not exceed said network capacity, said computed probability being less than an acceptable level E.

22. The device of claim 21 wherein said virtual circuit establishing means has means for computing said probability in terms of the peak data rate and average data rate for said virtual circuit.

23. The device of claim 22 wherein a buffer is assigned for each data link comprising a virtual circuit, said buffer having a plurality of slots for receiving the one or more data cells comprising data bursts for transmission therethrough, and wherein said cells are encoded with regard to their relative position within the burst, and wherein each buffer has one of said buffer reservation mechanisms associated therewith for monitoring the number of unallocated slots in its associated buffer, and determining how many unallocated slots are required for transmitting a data burst, means for comparing said number of unallocated slots with said required number of unallocated slots, and means for allocating a plurality of unallocated buffer slots to a plurality of cells comprising a burst in response to said comparing means, and means for switching between an idle state and an active state in response to said cell encoding and said comparing means.

24. The device of claim 23 wherein said means for monitoring and controlling the average data rate comprises a state dependent token pool mechanism (SDTPM), said SDTPM having means for generating tokens into a token pool at a pre-selected average data rate when active or idle, means for substracting tokens from said token pool at a pre-selected peak rate when active, and means for passing or discarding data cells at least partially in response to the presence or absence of tokens in said token pool.

* * * * *